US012737865B2

(12) United States Patent
Fujimori et al.

(10) Patent No.: US 12,737,865 B2
(45) Date of Patent: Sep. 15, 2026

(54) PROGRAM, CONDITION SEARCH APPARATUS, AND CONDITION SEARCH METHOD

(71) Applicant: Resonac Corporation, Tokyo (JP)

(72) Inventors: Takahiro Fujimori, Tokyo (JP); Shimpei Takemoto, Tokyo (JP); Yoshishige Okuno, Tokyo (JP)

(73) Assignee: RESONAC CORPORATION, Tokyo (JP)

( * ) Notice: Subject to any disclaimer, the term of this patent is extended or adjusted under 35 U.S.C. 154(b) by 337 days.

(21) Appl. No.: 18/688,463

(22) PCT Filed: Sep. 12, 2022

(86) PCT No.: PCT/JP2022/034099
§ 371 (c)(1),
(2) Date: Mar. 1, 2024

(87) PCT Pub. No.: WO2023/048009
PCT Pub. Date: Mar. 30, 2023

(65) Prior Publication Data

US 2025/0131547 A1 Apr. 24, 2025

(30) Foreign Application Priority Data

Sep. 22, 2021 (JP) ................................ 2021-153879

(51) Int. Cl.
*G06T 7/00* (2017.01)
*G06T 7/73* (2017.01)
*G06T 11/26* (2026.01)

(52) U.S. Cl.
CPC .............. *G06T 7/0002* (2013.01); *G06T 7/73* (2017.01); *G06T 11/26* (2026.01);
(Continued)

(58) Field of Classification Search
None
See application file for complete search history.

(56) References Cited

U.S. PATENT DOCUMENTS

2003/0237058 A1* 12/2003 Burghaus .............. G06Q 10/04 702/81
2013/0185041 A1 7/2013 Stander
(Continued)

FOREIGN PATENT DOCUMENTS

| | | |
|---|---|---|
| JP | 2005-519394 | 6/2005 |
| JP | 2020-128962 | 8/2020 |
| WO | 2017/195898 | 11/2017 |
| WO | 2019/181313 | 9/2019 |

OTHER PUBLICATIONS

Skrjanc Igor: "Evolving Fuzzy-Model-Based Design of Experiments With Supervised Hierarchical Clustering", IEEE Transactions on Fuzzy Systems, IEEE Service Center, Piscataway, NJ, US, vol. 23, No. 4, Aug. 1, 2015 (Aug. 1, 2015), pp. 861-871, XP011664797, ISSN: 1063-6706

(Continued)

*Primary Examiner* — Frank S Chen
(74) *Attorney, Agent, or Firm* — IPUSA, PLLC

(57) ABSTRACT

A computer is caused to function as a condition storage unit configured to store one or more conditions represented by coordinates in a multi-dimensional space, a candidate condition generating unit configured to generate a plurality of candidate conditions represented by coordinates in the multi-dimensional space, a candidate condition selecting unit configured to calculate, for a coordinate position of each of the candidate conditions, a shortest distance to coordinate positions of the one or more conditions, and to select, as a coordinate position of a new condition, a coordinate position of one of the candidate conditions for which the shortest distance is longest, and a new condition adding unit configured to add the selected coordinate position of the new (Continued)

condition to the coordinate positions of the one or more conditions, wherein the candidate condition selecting unit repeats, until a termination condition is satisfied, a process of calculating, for a coordinate position of each of the candidate conditions, a shortest distance to the coordinate positions of the one or more conditions to which the new condition is added, and selecting, as a coordinate position of a new condition, a coordinate position of one of the candidate conditions for which the shortest distance is longest.

7 Claims, 33 Drawing Sheets

(52) U.S. Cl.
CPC ............... *G06T 2207/10028* (2013.01); *G06T 2207/20092* (2013.01); *G06T 2210/56* (2013.01)

(56) References Cited

U.S. PATENT DOCUMENTS

2019/0076709 A1* 3/2019 Shimono .................. B32B 1/08
2020/0311963 A1* 10/2020 Yasutomi .............. G01S 19/393
2022/0090978 A1* 3/2022 Goldstein ............... E04B 1/665
2022/0383553 A1* 12/2022 Park ........................ G06T 9/001
2024/0312047 A1* 9/2024 Yoshida .................. G06T 17/00

OTHER PUBLICATIONS

Lu Lu et al: “Strategies for sequential design of experiments and augmentation”, Quality and Reliability Engineering International, John Wiley, US, vol. 37, No. 5, Dec. 23, 2020 (Dec. 23, 2020), pp. 1740-1757, XP071690870, ISSN: 0748-8017.

Coetzer R. L.J. et al: “Efficient maximin distance designs for experiments in mixtures”, Journal of Applied Statistics, vol. 39, No. 9, Sep. 1, 2012 (Sep. 1, 2012), pp. 1939-1951, XP093297077, ISSN: 0266-4763

* cited by examiner 500
503a
RECORDING MEDIA
503
EXTERNAL I/F
B
507
COMMU-NICATION I/F
501
INPUT DEVICE
502
DISPLAY DEVICE
504
RAM
505
ROM
506
CPU
508
HDD

HISTOGRAM OF NEAREST NEIGHBOR DISTANCE

VISUALIZATION OF LATTICE POINT GENERATION

HISTOGRAM OF NEAREST NEIGHBOR DISTANCE

HISTOGRAM OF NEAREST NEIGHBOR DISTANCE

HISTOGRAM OF NEAREST NEIGHBOR DISTANCE

HISTOGRAM OF NEAREST NEIGHBOR DISTANCE

HISTOGRAM OF NEAREST NEIGHBOR DISTANCE

HISTOGRAM OF NEAREST NEIGHBOR DISTANCE

CHANGE IN NEAREST NEIGHBOR DISTANCE

CHANGE IN NEAREST NEIGHBOR DISTANCE (GRAPH)

FIG.14B

| ROUND COUNT | LONGEST NEAREST NEIGHBOR DISTANCE |
|---|---|
| 1 | 0.781 |
| 2 | 0.730 |
| 3 | 0.730 |
| 4 | 0.547 |
| 5 | 0.484 |
| 6 | 0.483 |
| 7 | 0.392 |
| 8 | 0.392 |
| 9 | 0.392 |
| 10 | 0.392 |
| 11 | 0.370 |
| 12 | 0.370 |

EXISTING EXPERIMENTAL CONDITION

NEAREST NEIGHBOR DISTANCE=0.7

NEAREST NEIGHBOR DISTANCE=0.4

NEAREST NEIGHBOR DISTANCE=0.2

PROGRAM, CONDITION SEARCH APPARATUS, AND CONDITION SEARCH METHOD

TECHNICAL FIELD

The disclosures herein relate to programs, condition search apparatuses, and condition search methods.

BACKGROUND ART

Among others, optimization of the conditions for producing materials is an example of a multi-dimensional combinatorial problem. In the multi-dimensional combinatorial problem, the number of possible combinatorial patterns increases exponentially in accordance with the number of conditions (e.g., the number of elements that may be synthesized in the case of the ratio of composition in a multi-element alloy). One method for optimizing a multi-dimensional combinatorial problem, as known in the art, learns a correlation between experimental conditions and a property to be optimized based on past experimental results, and predicts a value of the property obtained under any given condition, thereby narrowing down candidate experimental conditions (for example, see PATENT DOCUMENT 1).

PRIOR ART DOCUMENTS

Patent Document

PATENT DOCUMENT 1: INTERNATIONAL PUBLICATION WO2019/181313

SUMMARY OF INVENTION

Problem to be Solved by Invention

In order to determine a new experimental condition based on past experimental results, for example, an experimental condition at coordinates distant from the experimental conditions of experiments that have already been performed and represented by coordinates in space may be selected as a new experimental condition. Such an arrangement is expected to lead to an efficient search for a new experimental condition.

It is an object of the present disclosures to provide a program, a condition search apparatus, and a condition search method that may efficiently search for a new condition from one or more conditions represented by coordinates in a multi-dimensional space.

Solution to Problem

The present disclosures include the following configurations.

[1] A program for causing a computer to function as:

a condition storage unit configured to store one or more conditions represented by coordinates in a multi-dimensional space;

a candidate condition generating unit configured to generate a plurality of candidate conditions represented by coordinates in the multi-dimensional space;

a candidate condition selecting unit configured to calculate, for a coordinate position of each of the candidate conditions, a shortest distance to coordinate positions of the one or more conditions, and to select, as a coordinate position of a new condition, a coordinate position of one of the candidate conditions for which the shortest distance is longest; and a new condition adding unit configured to add the selected coordinate position of the new condition to the coordinate positions of the one or more conditions, wherein the candidate condition selecting unit repeats, until a termination condition is satisfied, a process of calculating, for a coordinate position of each of the candidate conditions, a shortest distance to the coordinate positions of the one or more conditions to which the new condition is added, and selecting, as a coordinate position of a new condition, a coordinate position of one of the candidate conditions for which the shortest distance is longest.

[2] The program as recited in [1], further causing the computer to function as:

a threshold setting receiving unit configured to accept a setting of a threshold from a user wherein the candidate condition selecting unit determines whether the termination condition is satisfied based on a result of comparison between the shortest distance that is longest and a threshold.

[3] The program as recited in [2], wherein the candidate condition selecting unit determines that the termination condition is satisfied when both the shortest distance of one of the candidate conditions selected in an N-th round and the shortest distance of one of the candidate conditions selected in an (N−1)-th round are less than or equal to a threshold and the shortest distance of the one of the candidate conditions selected in the N-th round and the shortest distance of the one of the candidate conditions selected in the (N−1)-th round are different from each other.

[4] The program as recited in any one of [1] to [3], wherein the candidate condition generating unit generates the plurality of candidate conditions by using random numbers, lattice points, or a design of experiments method.

[5] The program as recited in any one of [1] to [4], wherein the candidate condition selecting unit selects the coordinate position of the new condition such that the coordinate positions of the one or more conditions and the coordinate position of the new condition are scattered in the multi-dimensional space.

[6] The program as recited in any one of [1] to [5], wherein the conditions are experimental conditions for composing a material.

[7] A condition search apparatus comprising:

a condition storage unit configured to store one or more conditions represented by coordinates in a multi-dimensional space;

a candidate condition generating unit configured to generate a plurality of candidate conditions represented by coordinates in the multi-dimensional space;

a candidate condition selecting unit configured to calculate, for a coordinate position of each of the candidate conditions, a shortest distance to coordinate positions of the one or more conditions, and to select, as a coordinate position of a new condition, a coordinate position of one of the candidate conditions for which the shortest distance is longest; and a new condition adding unit configured to add the selected coordinate position of the new condition to the coordinate positions of the one or more conditions, wherein the candidate condition selecting unit repeats, until a termination condition is satisfied, a process of calculating, for a coordinate position of each of the candidate conditions, a shortest distance to the coordinate positions of the one or more conditions to which the new condition is added, and selecting, as a coordinate position of a new condition, a coordinate position of one of the candidate conditions for which the shortest distance is longest.

[8] A condition search method comprising:

more a storing step of storing one or conditions represented by coordinates in a multi-dimensional space;

a generating step of generating a plurality of candidate conditions represented by coordinates in the multi-dimensional space;

a selecting step of, upon calculating, for a coordinate position of each of the candidate conditions, a shortest distance to coordinate positions of the one or more conditions, selecting a coordinate position of one of the candidate conditions for which the shortest distance is longest as a coordinate position of a new condition; and an adding step of adding the selected coordinate position of the new condition to the coordinate positions of the one or more conditions, wherein the selecting step of, upon calculating, for a coordinate position of each of the candidate conditions, a shortest distance to coordinate positions of the one or more conditions to which the new condition is added, selecting a coordinate position of one of the candidate conditions for which the shortest distance is longest as a coordinate position of a new condition, and the adding step of adding the selected coordinate position of the new condition to the coordinate positions of the one or more conditions are repeated until a termination condition is satisfied.

Advantageous Effects of Invention

According to the present disclosures, a new condition may be efficiently searched for from one or more conditions represented by coordinates in a multi-dimensional space.

BRIEF DESCRIPTION OF DRAWINGS

FIG. 14B A drawing illustrating changes in the longest nearest neighbor distances.

EMBODIMENTS TO CARRY OUT INVENTION

In the following, an embodiment of the present invention will be described in detail. The present invention is not limited to the following embodiment. In the present embodiment, experimental conditions for composing a material represented by coordinates in a two-dimensional space, which is an example of a multi-dimensional space, will be described as an example of the one or more conditions represented by coordinates in a multi-dimensional space.

First Embodiment

<System Configuration>

Figure 1:
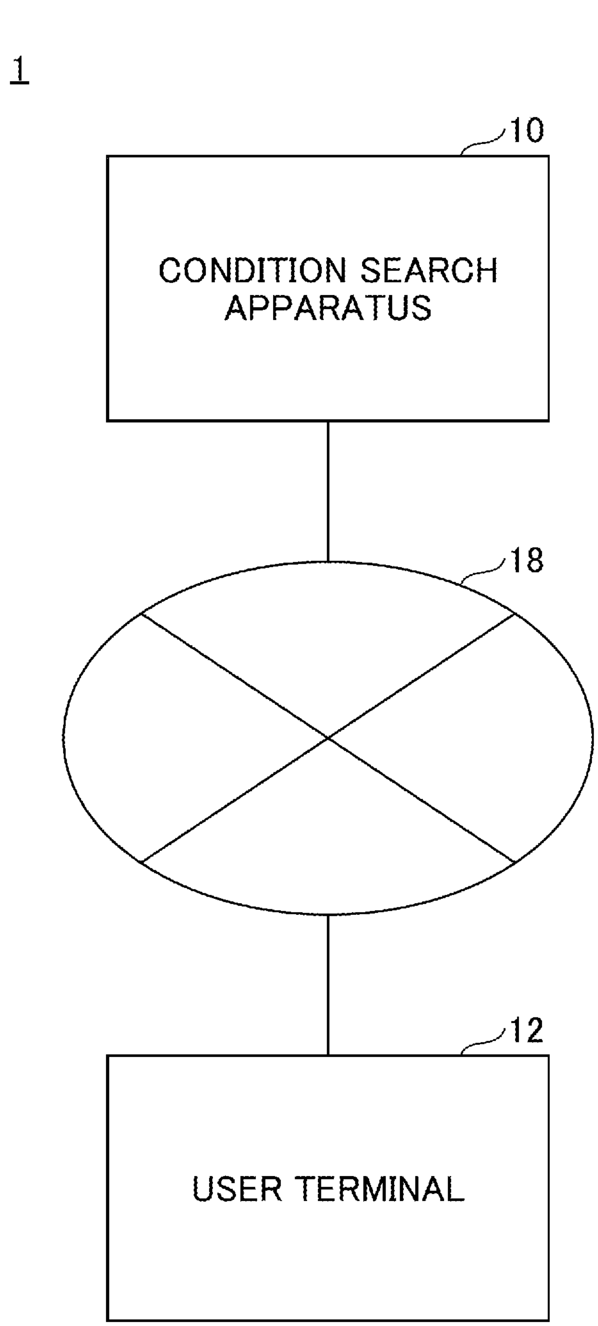
FIG. 1 A drawing illustrating an example of the configuration of an information processing system according to a present embodiment.

FIG. 1 is a drawing illustrating an example of the configuration of an information processing system according to the present embodiment. The information processing system 1 of FIG. 1 includes a condition search apparatus 10 and a user terminal 12. The condition search apparatus 10 and the user terminal 12 are connected to each other via a communication network 18 such as a local area network (LAN) or the Internet so as to enable data communication.

The user terminal 12 is an information processing terminal such as a personal computer, a tablet terminal, and a smartphone operated by a user. The user terminal 12 receives input information necessary to search for an experimental condition for composing a material from a user, and causes the condition search apparatus 10 to search for an experimental condition for composing the material. Further, the user terminal 12 receives information such as the experimental condition for composing the material found by the condition search apparatus 10, and displays the information on a display device, for example, to allow the user to check the information.

The condition search apparatus 10 is an information processing apparatus such as a PC or a workstation that searches for an experimental condition for a material composition. The condition search apparatus 10 searches for a new experimental condition based on existing experimental conditions, as will be described later, using existing experimental data of the experiments that have already been performed. The condition search apparatus 10 transmits information such as the experimental condition found through the search to the user terminal 12.

The information processing system 1 of FIG. 1 is only an example, and it is needless to say that various system configurations are possible according to usage and purpose. For example, the condition search apparatus 10 may be implemented as a plurality of computers or may be implemented as a service provided by cloud computing. The information processing system 1 of FIG. 1 may be implemented as a stand-alone computer.

<Hardware Configuration>

Figure 2:
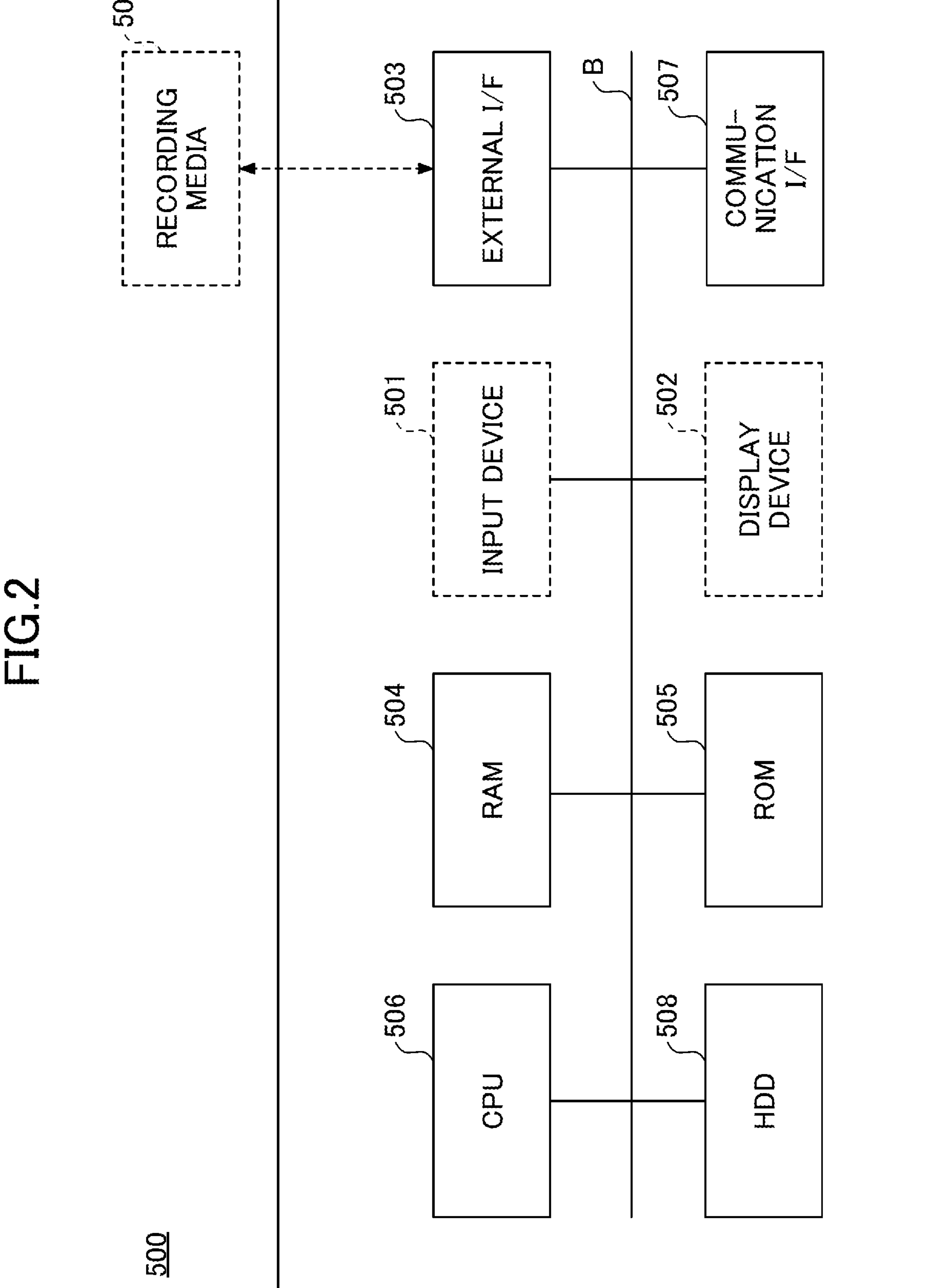
FIG. 2 A drawing illustrating an example of the hardware configuration of a computer according to the present embodiment.

The condition search apparatus 10 and the user terminal 12 of FIG. 1 may each be implemented as, for example, a computer 500 having a hardware configuration illustrated in FIG. 2.

FIG. 2 is a drawing illustrating an example of the hardware configuration of a computer according to the present embodiment. The computer 500 in FIG. 2 includes an input device 501, a display device 502, an external I/F 503, a RAM 504, a ROM 505, a CPU 506, a communication I/F 507, an HDD 508, and the like, which are connected to each other via a bus B. The input device 501 and the display device 502 may alternatively be used through connections.

The input device 501 is a touch panel, operation keys and buttons, a keyboard, a mouse, and/or the like used by a user to input various signals. The display device 502 is composed of a display such as a liquid crystal or organic EL display that shows a screen, a speaker that outputs sound data such as voice or sound, and the like. The communication I/F 507 is an interface for the computer 500 to perform data communication.

The HDD 508 is an example of a non-volatile storage unit that stores programs and data. The stored programs and data include an OS, which is basic software for providing overall control of the computer 500, and applications for providing various functions on the OS. The computer 500 may use a drive device using a flash memory as a storage media (e.g., a solid-state drive (SSD)), instead of the HDD 508.

The external I/F 503 is an interface for an external device. The external device includes a recording media 503*a*. The computer 500 may read and/or write data from/to the recording media 503*a* via the external I/F 503. The recording media 503*a* include a flexible disk, a CD, a DVD, a SD memory card, a USB stick, or the like.

The ROM 505 is an example of a nonvolatile semiconductor memory (i.e., storage unit) configured to retain programs and data even when the power is turned off. The ROM 505 stores programs and information such as a BIOS to be executed when the computer 500 is activated, OS settings, and network settings. The RAM 504 is an example of a volatile semiconductor memory (i.e., storage unit) that temporarily stores programs and data.

The CPU 506 is an arithmetic unit that loads programs and data from a storage unit such as the ROM 505 or the HDD 508 into the RAM 504, and executes processing to provide overall control of the computer 500 and provide functions. The computer 500 according to the present embodiment may provide various functions of the condition search apparatus 10 and the user terminal 12, as will be described later, by executing programs.

<Functional Configuration>

Figure 3:
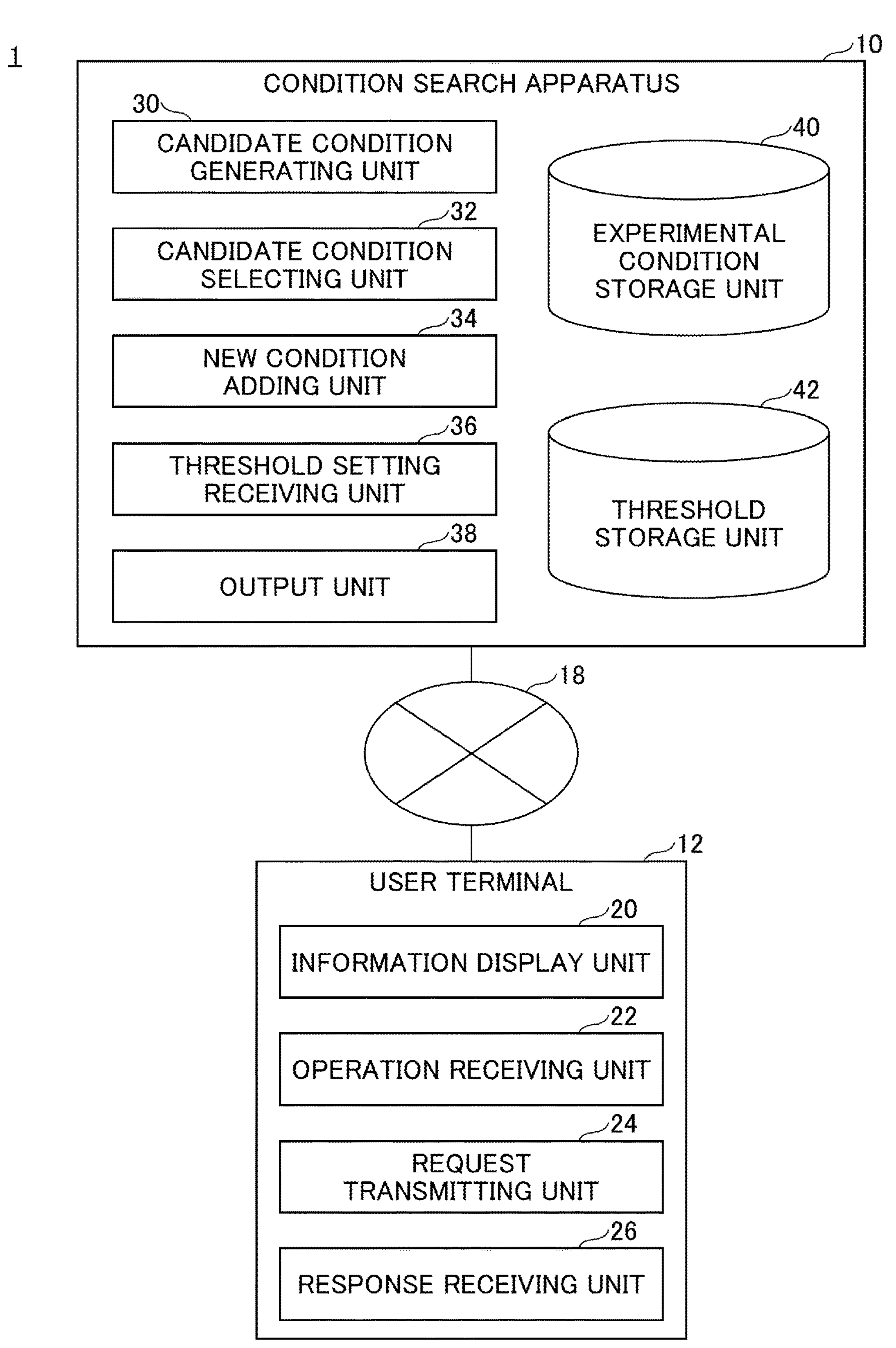
FIG. 3 A drawing illustrating an example of the functional block of the information processing system according to the present embodiment.

There will be a description of the configuration of the information processing system 1 according to the present embodiment. FIG. 3 is a drawing illustrating an example of the functional configuration of the information processing system according to the present embodiment. In the configuration diagram of FIG. 3, parts unnecessary for the description of the present embodiment are omitted as appropriate.

The condition search apparatus 10 of the information processing system 1 illustrated in FIG. 3 includes a candidate condition generating unit 30, a candidate condition selecting a new condition adding unit 34, a threshold setting receiving unit 36, an output unit 38, an experimental condition storage unit 40, and a threshold storage unit 42. The user terminal 12 includes an information display unit 20, an operation receiving unit 22, a request transmitting unit 24, and a response receiving unit 26.

The information display unit 20 of the user terminal 12 displays information to be checked by the user on the display device 502. The operation receiving unit 22 receives various operational information from the user such as input information necessary to search for experimental conditions. The request transmitting unit 24 transmits a request such as a request to search for an experimental condition to the condition search apparatus 10. The response receiving unit 26 receives a response to the request, such as a request to search for an experimental condition, transmitted by the request transmitting unit 24.

The experimental condition storage unit 40 of the condition search apparatus 10 stores the existing experiment data of experiments that have already been performed, which include information on existing experimental conditions as will be described later. The experimental condition storage unit 40 stores information about new experimental conditions as will be described later. The experimental condition storage unit 40 stores the existing and new experimental conditions for composing a material as represented by coordinates in two-dimensional space, as will be described later. The threshold storage unit 42 stores a threshold set by the user.

The candidate condition generating unit 30 generates a plurality of candidate conditions represented by coordinates in two-dimensional space, as will be described later. The candidate condition unit 32 calculates, for each of the selecting generated candidate conditions, the shortest distance (nearest neighbor distance) between the coordinates thereof and the coordinates of the existing and new experimental conditions, as will be described later. The candidate condition selecting unit 32 selects the coordinates of a candidate condition having the longest nearest neighbor distance as the coordinates of a new experimental condition, as will be described later. The new condition adding unit 34 stores as a new addition the selected coordinates of a new experimental condition in the experimental condition storage unit 40.

The processing performed by the candidate condition selecting unit 32 and the new condition repeated until the candidate adding unit 34 is condition selecting unit 32 determines that the termination condition described later is satisfied. For example, the candidate condition selecting unit 32 determines whether the termination condition is satisfied, as will be described later, based on the result of comparison between the longest nearest neighbor distance and a threshold.

The threshold setting receiving unit 36 accepts a setting of the threshold from the user, and stores the setting in the threshold storage unit 42. The output unit 38 transmits the experimental condition found in the search as a response to the request to search for an experimental condition for composing the material from the user terminal 12, for example. It may be noted that the configuration illustrated in FIG. 3 is an example. The information processing system 1 according to the present embodiment may have various alternative configurations.

<Preconditions for the Invention>

Figure 4A:
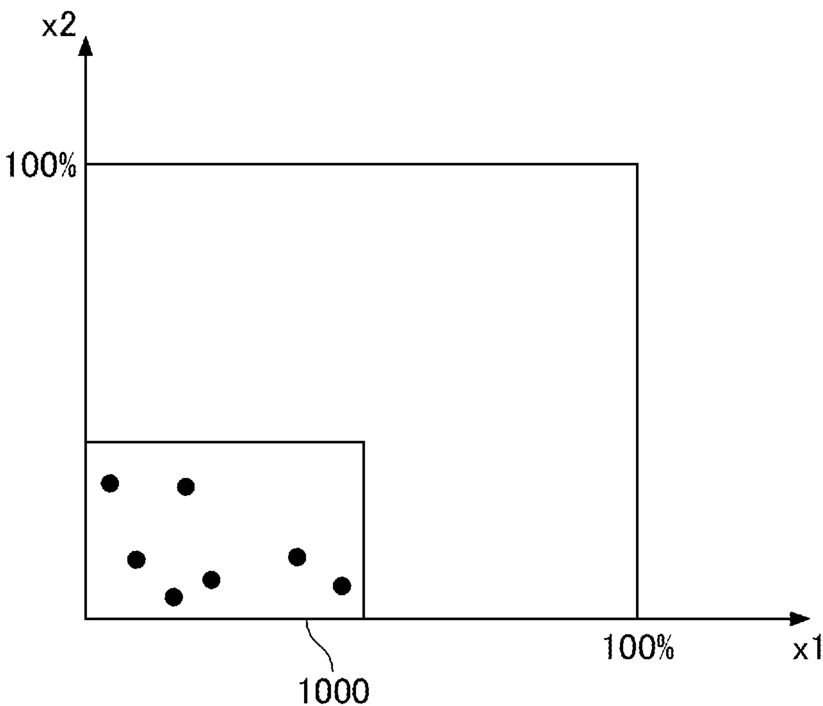
FIG. 4A A drawing illustrating an example of preconditions for searching for a new experimental condition according to the present embodiment.
Figure 4B:
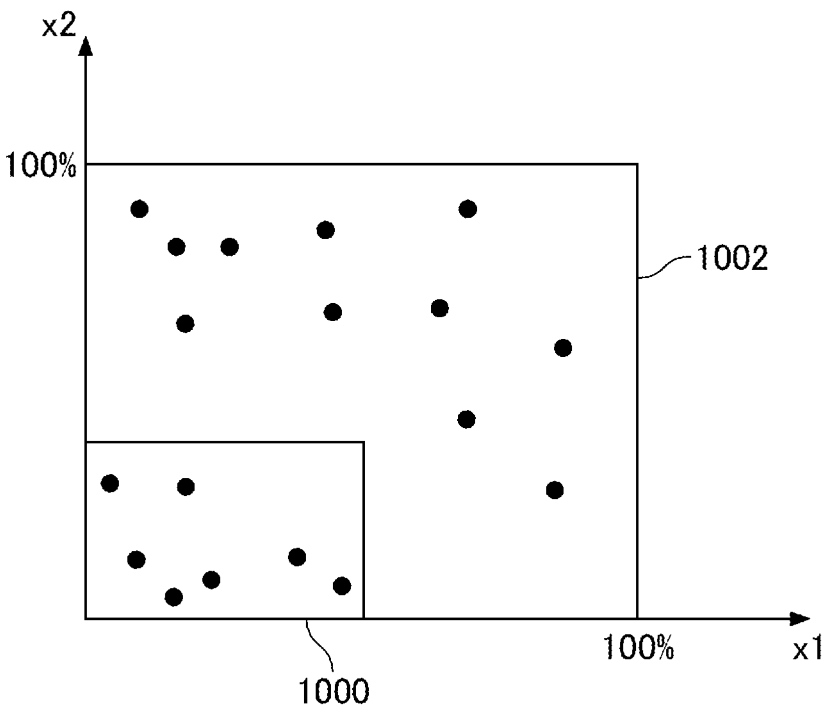
FIG. 4B A drawing illustrating an example of preconditions for searching for a new experimental condition according to the present embodiment.
Figure 5A:
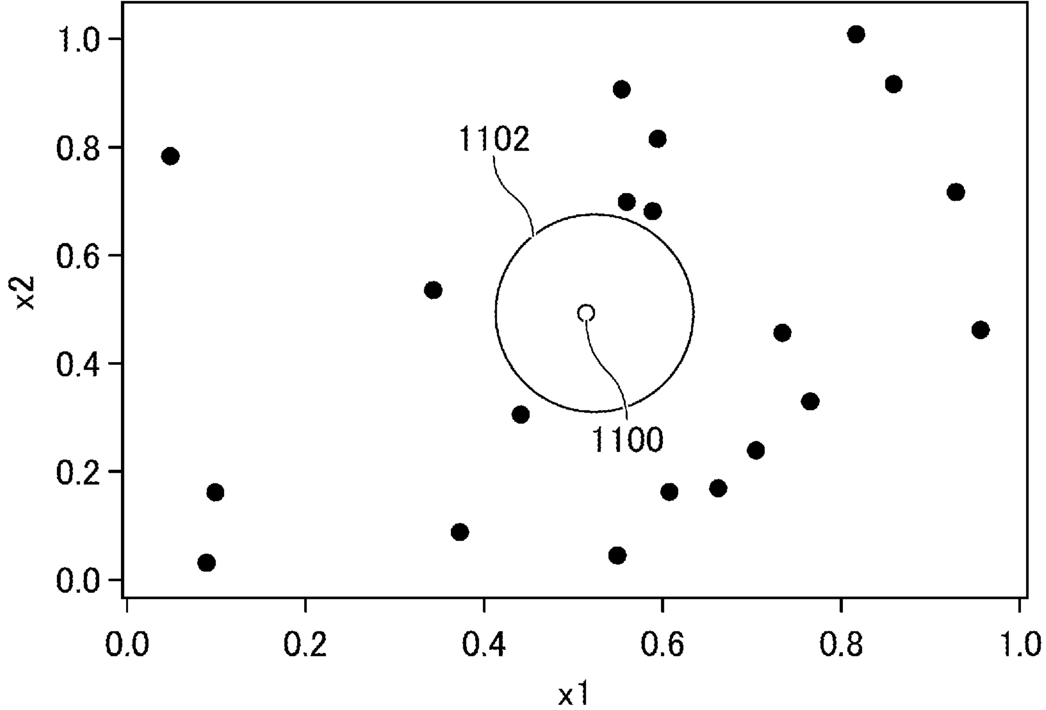
FIG. 5A A drawing illustrating an example of the outline of a search process for a new experimental condition according to the present embodiment.
Figure 5B:
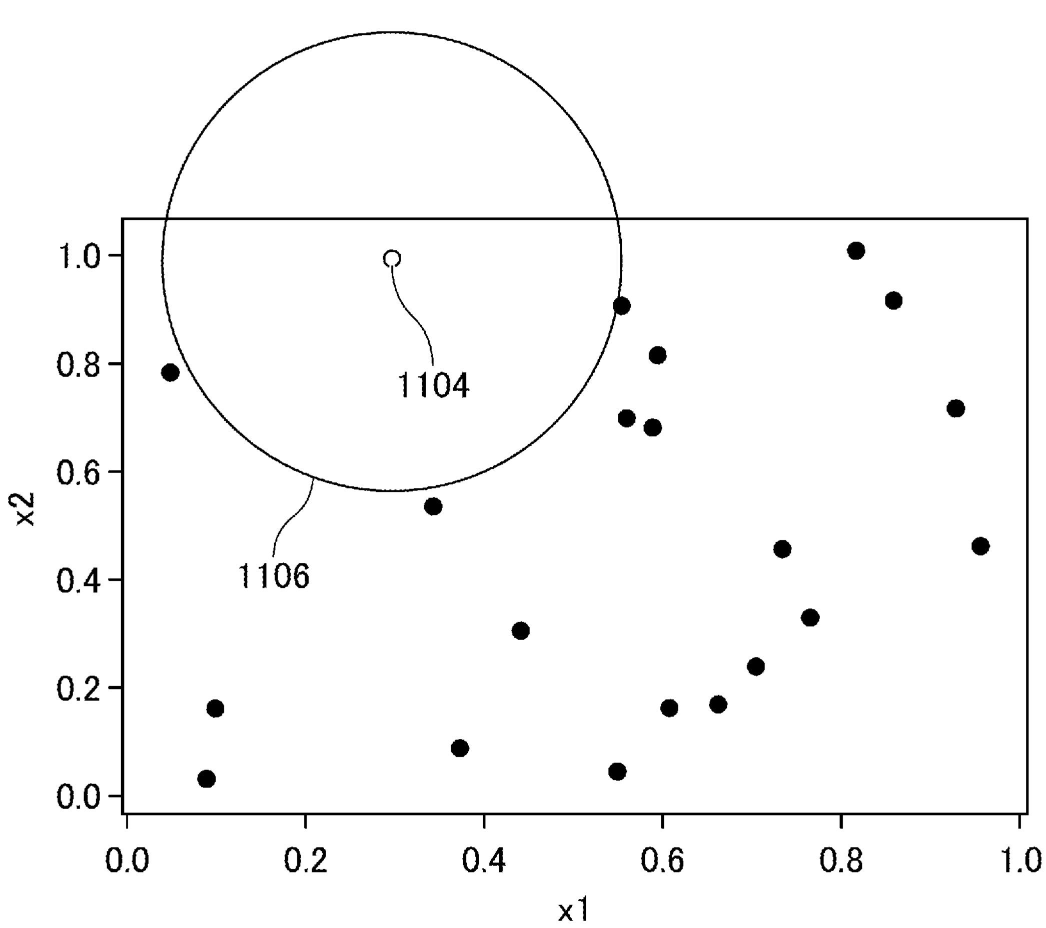
FIG. 5B A drawing illustrating an example of the outline of a search process for a new experimental condition according to the present embodiment.

The information processing system 1 according to the present embodiment searches for a new experimental condition based on existing experimental conditions included in the existing experimental data of experiments that have already been performed, for example, as illustrated in FIG. 4A, FIG. 4B, FIG. 5A, and FIG. 5B. FIG. 4A and FIG. 4B are drawings illustrating an example of preconditions for searching for a new experimental condition according to the present embodiment. FIG. 5A and FIG. 5B are drawings illustrating an example of the outline of a process of searching for a new experimental condition according to the present embodiment.

In FIG. 4A, FIG. 4B, FIG. 5A, and FIG. 5B, the experimental conditions are represented by coordinates in two-dimensional space of x1 and x2. x1 and x2 are some parameters of an experimental condition. Note that the present embodiment is described with reference to an example in which a two-dimensional space with two types of parameter is used for ease of understanding, but it suffices for the space to be multi-dimensional space with two or more types of parameter. Each of the points illustrated in FIG. 4A, FIG. 4B, FIG. 5A, and FIG. 5B has different coordinates to represent a different experimental condition.

FIG. 4A is an example of a point cloud of existing experimental conditions included in the existing experimental data of experiments that have already been performed. It is assumed here that there are no experimental conditions satisfying a required property among the experimental conditions represented by the point cloud of FIG. 4A. It is also assumed that a further search in a region 1000 where the point cloud of FIG. 4A exists is unlikely to find an experimental condition satisfying the required property.

Upon assuming that the likelihood of finding an experimental condition satisfying the required property is low when further searing in the region 1000, it becomes necessary to search for an experimental condition in a region 1002 other than the region 1000 as illustrated in FIG. 4B. A method of generating experimental conditions in the region 1002 includes a generation method utilizing a design of experiments method, a generation method utilizing random numbers, a generation method utilizing lattice points, and the like.

When searching for an experimental condition in the region 1002, it is expected that a search for an experimental condition may preferably be set to start from those points in the region 1002 which are far away from the point cloud existing in the region 1000 in order to raise the possibility of achieving efficient search. However, as the number of parameters of experimental conditions increases and thus the number of dimensions of the multi-dimensional space representing the experimental conditions by coordinates increases, it becomes more difficult to select points in the region 1002 far away from the point cloud existing in the region 1000.

In consideration of these, the present embodiment is configured such that a point is defined as the point farthest from the existing experimental conditions when the shortest distance (i.e., nearest neighbor distance) to the point clouds of existing experimental conditions included in the existing experimental data of experiments that have already been performed is the longest for such a point as shown in FIGS. 5A and 5B. The nearest neighbor distance is the shortest distance among the distances to the individual points of the point cloud of the existing experimental conditions included in the existing experiment data of experiments that have already been performed, and is the distance from the point of the new experimental condition to the nearest point (i.e., nearest neighbor point) indicative of an existing experimental condition.

FIG. 5A illustrates a circle 1102 having a radius equal to the distance from a point 1100 of a new experimental condition to the nearest neighbor point. FIG. 5B illustrates a circle 1106 having a radius equal to the distance from a point 1104 of a new experimental condition to the nearest point. In the example shown in FIG. 5B, the point 1104 of a new experimental condition is the point having the nearest neighbor distance that is the longest. As shown in FIG. 5A and FIG. 5B, the present embodiment selects a new experimental condition for which a circle or a sphere having a radius equal to the nearest neighbor distance becomes the largest.

Note that the calculation of the nearest neighbor distance does not necessarily have to be performed for the entire point cloud of existing experimental conditions, and the computational load may be reduced by utilizing an algorithm that picks up points that are likely to be close in distance among the points of the point cloud of existing experimental conditions, for example.

<Processing>

In the following, the details of a process performed by the information processing system 1 according to the present embodiment will be described with respect to a search for a new experimental condition based on existing experimental conditions included in the existing experimental data of experiments that have already been performed.

Figure 6:
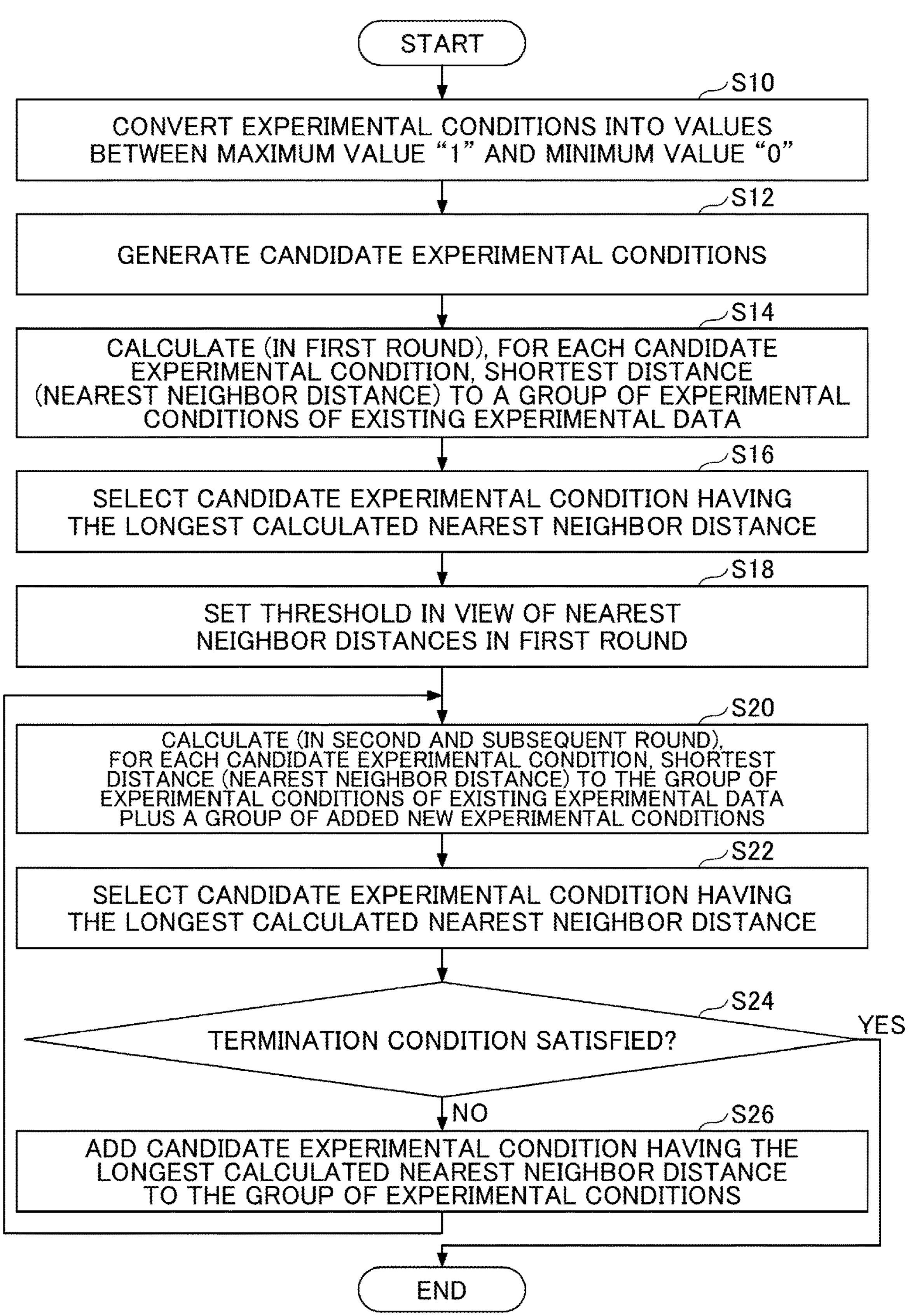
FIG. 6 A flowchart of an example of a condition search process of the information processing system according to the present embodiment.

FIG. 6 is a flowchart illustrating an example of a condition search process performed by the information processing system according to the present embodiment. In step S10, the condition search apparatus 10 converts the existing experimental conditions stored in the experimental condition storage unit 40 into values between a maximum value of "1" and a minimum value of "0". Step S10 is a process of normalizing the parameters of experimental conditions.

Figure 7A:
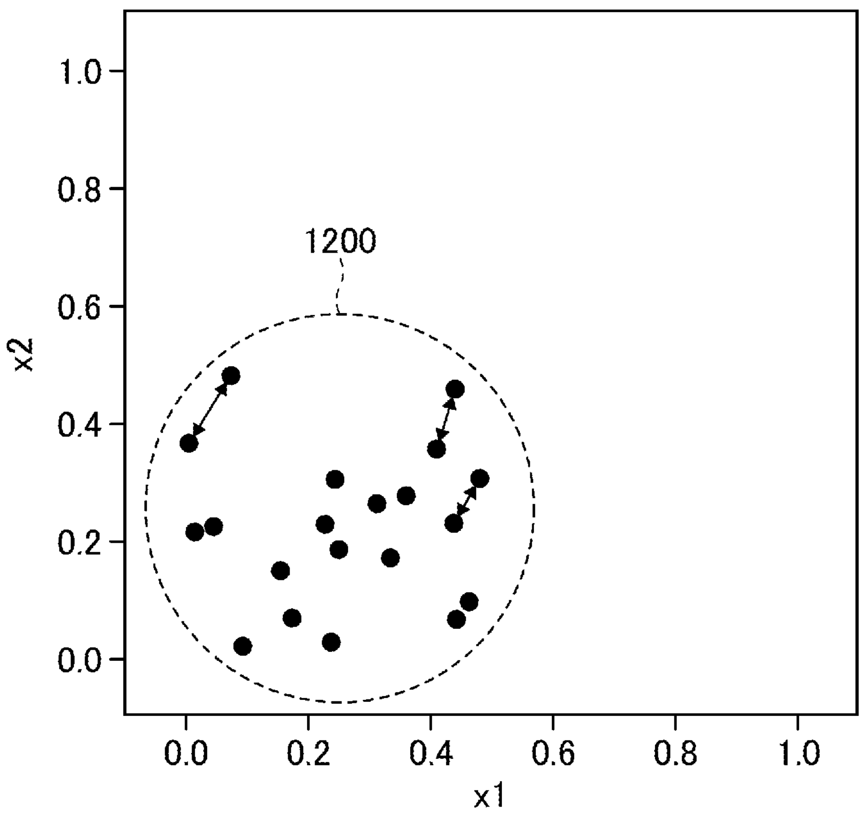
FIG. 7A A drawing illustrating an example of normalized existing experimental conditions.
Figure 7B:
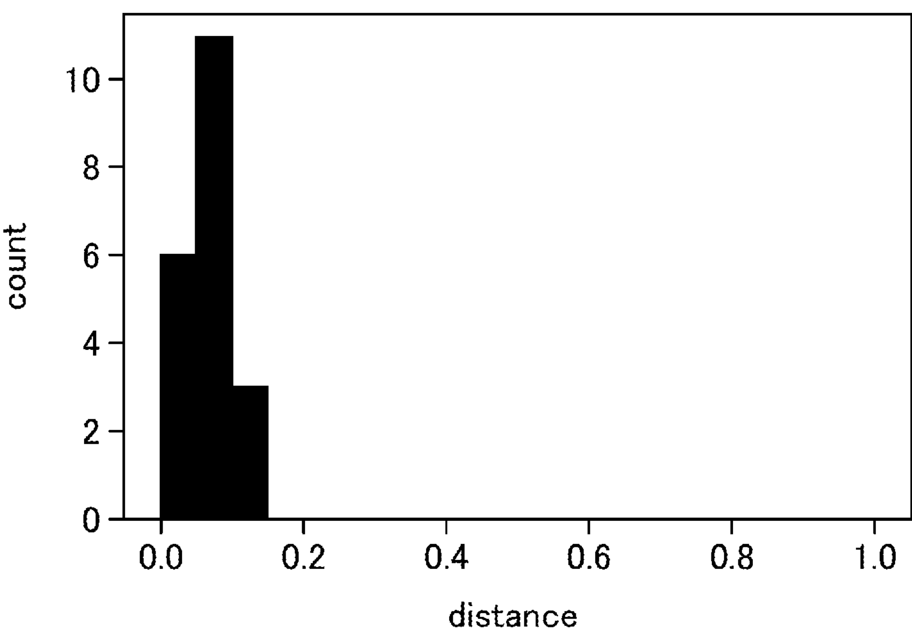
FIG. 7B A drawing illustrating an example of normalized existing experimental conditions.

FIG. 7A and FIG. 7B are drawings illustrating an example of normalized existing experimental conditions. FIG. 7A illustrates an example of a point cloud 1200 of normalized existing experimental conditions. The condition search apparatus 10 may calculate the nearest neighbor distance for each of the points in the point cloud 1200. In the FIG. 7A, some of the nearest neighbor distances are indicated by arrows. FIG. 7B illustrates a histogram of the nearest neighbor distances calculated using FIG. 7A.

In step S12, the condition search apparatus 10 generates a plurality of candidate experimental conditions. For example, the condition search apparatus 10 generates a plurality of candidate experimental conditions using a design of experiments method, random numbers, or lattice points. In the following, a process of generating a plurality of candidate experimental conditions using lattice points will be described.

Figure 8A:
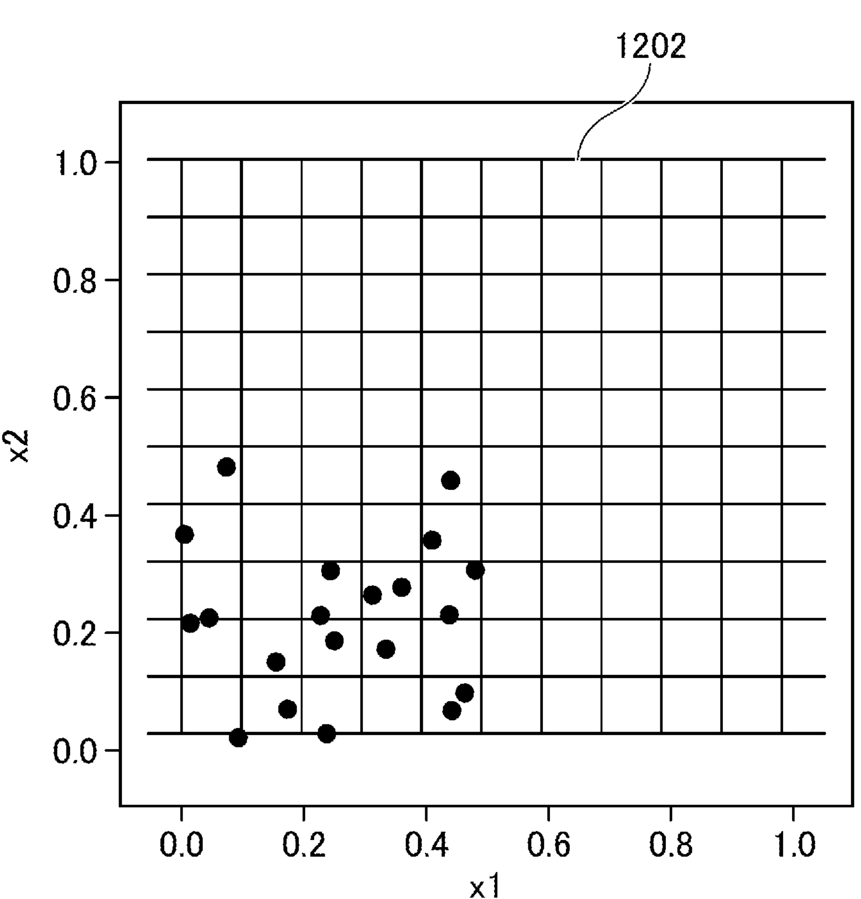
FIG. 8A A drawing illustrating an example of a plurality of candidate experimental conditions using lattice points.
Figure 8B:
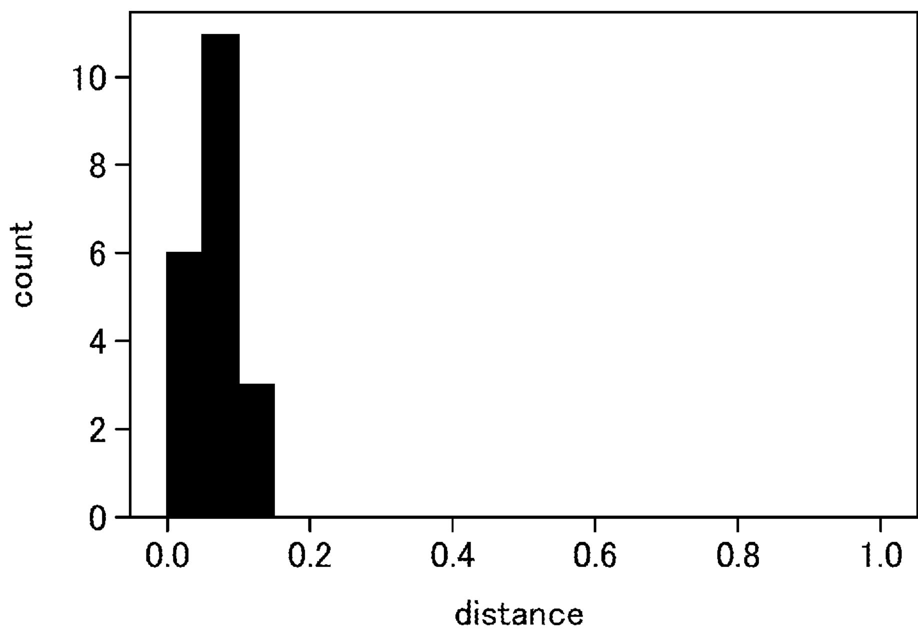
FIG. 8B A drawing illustrating an example of a plurality of candidate experimental conditions using lattice points.

FIG. 8A and FIG. 8B are drawings illustrating an example of a plurality of candidate experimental conditions using lattice points. In FIG. 8A, lattice points 1202 are generated with respect to the parameters x1 and x2 of experimental conditions from 0 to 1.0 (in 0.1 increments). These lattice points 1202 represent a plurality of candidate experimental conditions.

In step S14, the condition search apparatus 10 calculates the shortest distance (i.e., the nearest neighbor distance) to the point cloud 1200 of the existing experimental conditions for each of the plurality of candidate experimental conditions represented by the lattice points 1202 in FIG. 8A. Step S14 is the calculation of nearest neighbor distances in the first round.

Figure 9A:
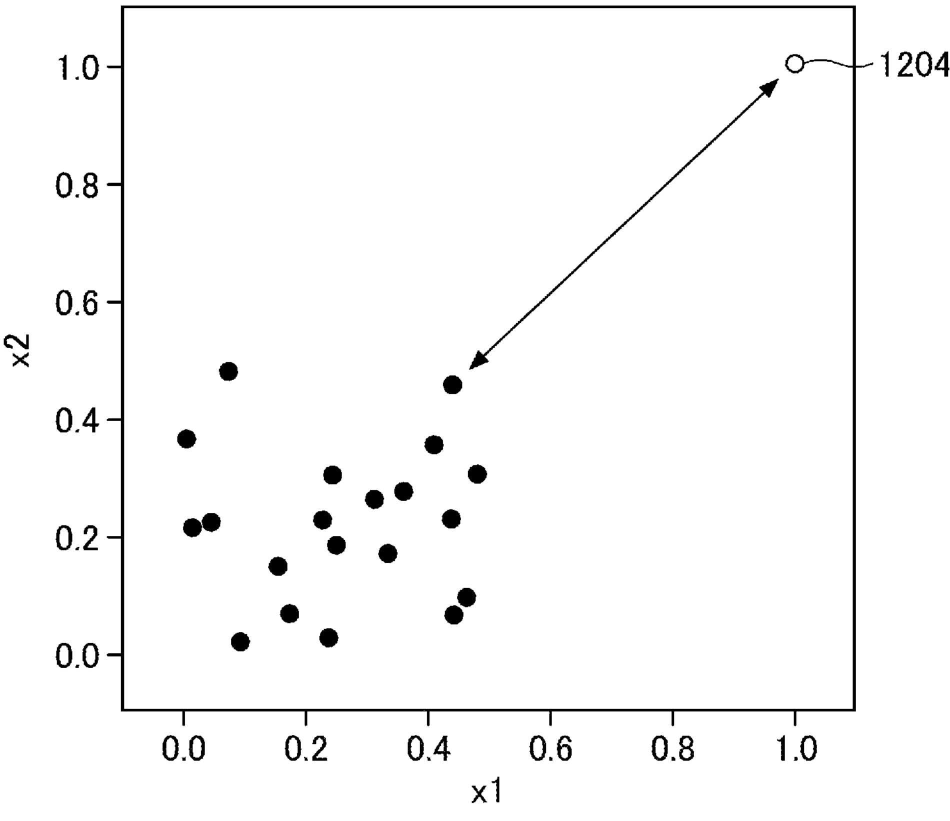
FIG. 9A A drawing illustrating an example of a candidate experimental condition having the longest nearest neighbor distance.
Figure 9B:
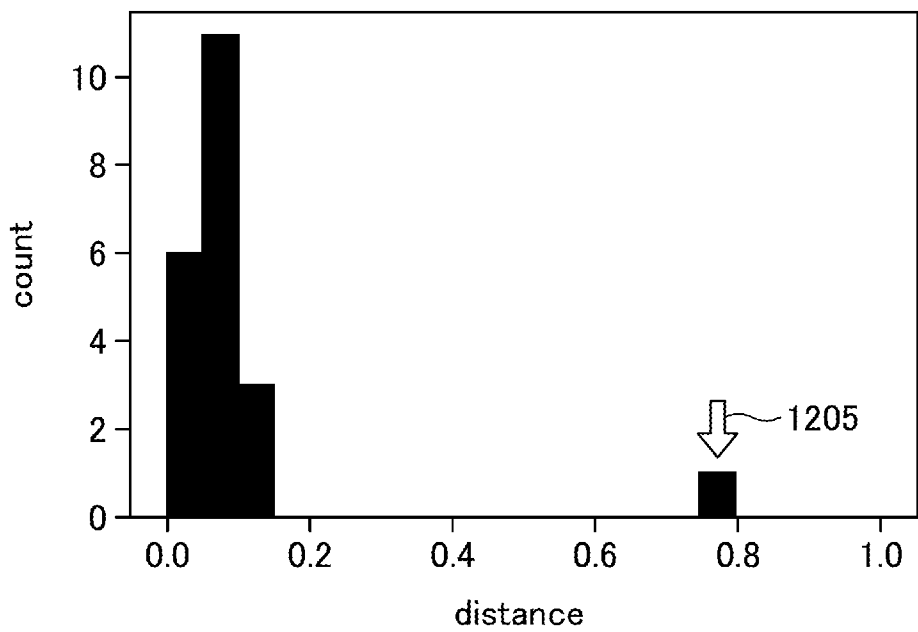
FIG. 9B A drawing illustrating an example of the candidate experimental condition having the longest nearest neighbor distance.

In step S16, the condition search apparatus 10 selects the candidate experimental condition having the longest nearest neighbor distance calculated in step S14 in the first round. FIG. 9A and FIG. 9B are drawings illustrating an example of the candidate experimental condition having the longest nearest neighbor distance.

FIG. 9A shows an example in which the nearest neighbor distance of candidate the experimental condition represented by a point 1204 is the longest among the nearest neighbor distances calculated for the respective candidate experimental conditions represented by the lattice points 1202 in FIG. 8A. In FIG. 9A, the nearest neighbor distance of the candidate experimental condition represented by the point 1204 is indicated by an arrow. Further, FIG. 9B shows an example of a histogram to which the nearest neighbor distance of the point 1204 illustrated in FIG. 9A is added. An arrow 1205 in FIG. 9B indicates the nearest neighbor distance of the point 1204.

In step S18, the condition search apparatus 10 accepts a setting of a threshold made in view of the nearest neighbor distances in the first round. The threshold in step S18 may be set by the user checking the histogram of FIG. 9B, or may be automatically set by utilizing a table in which the nearest neighbor distances and thresholds are associated with each other. The threshold is used to determine whether the termination condition in step S24 is satisfied.

In step S20, the condition search apparatus 10 calculates, for each of the candidate experimental conditions represented by the lattice points 1202 in FIG. 8A except for the point 1204 of the candidate experimental condition having the longest nearest neighbor distance in the first round, the shortest distance (i.e., nearest neighbor distance) to the point cloud of the existing experimental conditions plus the point of the candidate experimental condition having the longest nearest neighbor distance in the first round. Step S20 is the calculation of nearest neighbor distances in the second or subsequent round.

Figure 10A:
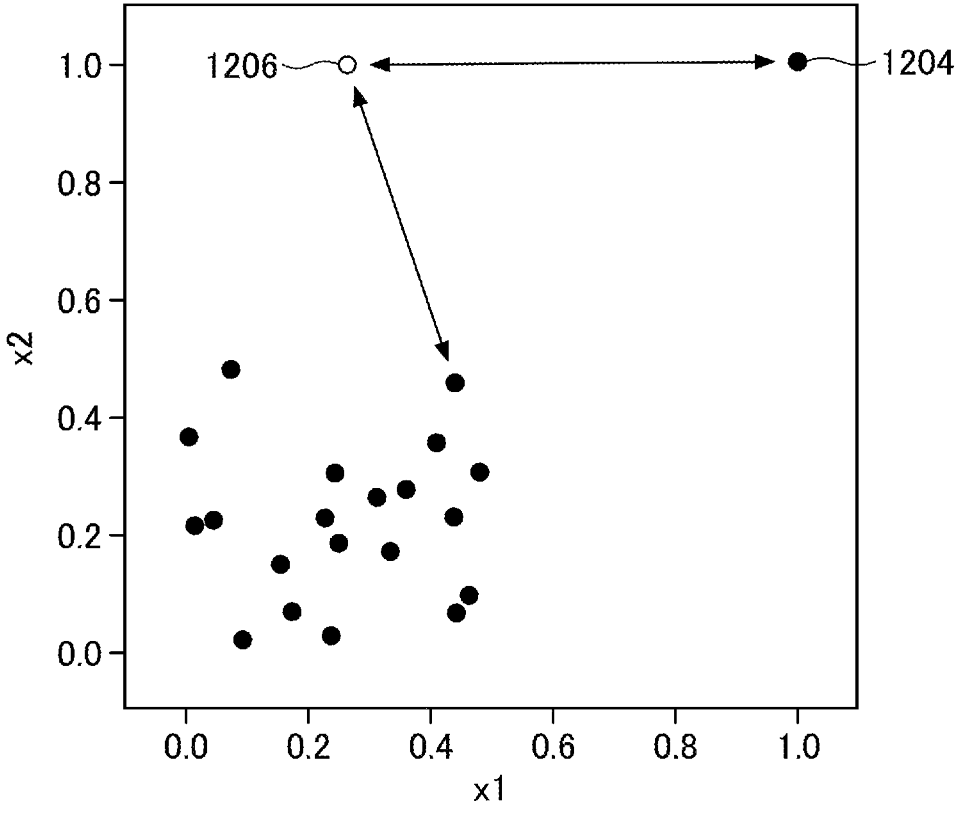
FIG. 10A A drawing illustrating an example of a candidate experimental condition having the longest nearest neighbor distance.
Figure 10B:
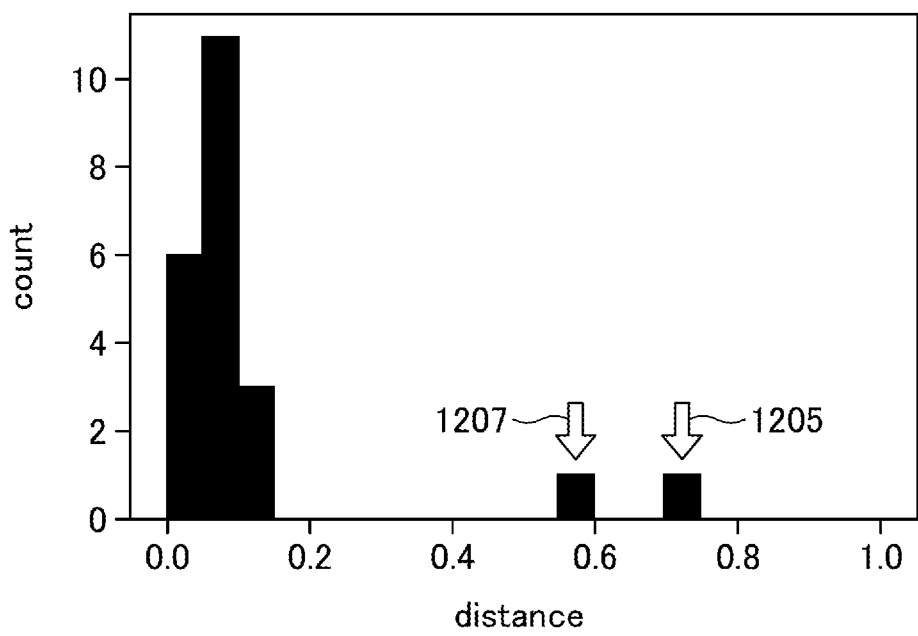
FIG. 10B A drawing illustrating an example of the candidate experimental condition having the longest nearest neighbor distance.

In step S22, the condition search apparatus 10 selects the candidate experimental condition having the longest nearest neighbor distance calculated in step S20 in the second or subsequent round. FIG. 10A and FIG. 10B are drawings illustrating an example of the candidate experimental condition having the longest nearest neighbor distance.

FIG. 10A shows an example in which the nearest neighbor distance of the candidate experimental condition represented by a point 1206 is the longest in the step S22. In FIG. 10A, the nearest neighbor distance of the candidate experimental condition represented by the point 1206 and the nearest neighbor distance of the candidate experimental condition represented by the point 1204 are indicated by arrows. FIG. 10B further shows an example of a histogram to which the nearest neighbor distances of the points 1204 and 1206 shown in FIG. 10A are added. An arrow 1205 in FIG. 10B indicates the nearest neighbor distance of the point 1204. An arrow 1207 in FIG. 10B indicates the nearest neighbor distance of the point 1206. In the histogram of FIG. 10B, the nearest neighbor distance of the point 1204 indicated by the arrow 1205 decreases relative to that shown in FIG. 9B due to the calculation for the second time of the nearest neighbor distances.

As described above, the shape of the histogram, as illustrated in FIGS. 8B and 9B, changes by repeating the processes in steps S20 and S22. In step S24, the condition search apparatus 10 determines whether or not the termination condition is satisfied by using the threshold set in step S18.

For example, the condition search apparatus 10 determines whether the termination condition is satisfied based on a result of comparison between the longest nearest neighbor distance identified in step S22 and the threshold set in step S18. The condition search apparatus 10 repeats the processes in steps S20 through S26 until the termination condition is determined to be satisfied.

An example of the termination condition is whether the longest nearest neighbor distance identified in step S22 is less than threshold. If the longest nearest neighbor distance identified in step S22 is less than the threshold, the condition search apparatus 10 determines that the termination condition is satisfied.

Another example of the termination condition is whether both the longest nearest neighbor distance identified in the N-th round and the longest nearest neighbor distance identified in the (N−1)-th round are smaller than the threshold and the longest nearest neighbor distance identified in the N-th round and the longest nearest neighbor distance identified in the (N−1)-th round are different from each other.

When both the longest nearest neighbor distance identified in the N-th round and the longest nearest neighbor distance identified in the (N−1)-th round are less than the threshold and the longest nearest neighbor distance identified in the N-th round and the longest nearest neighbor distance identified in the (N−1)-th round are different from each other, the condition search apparatus 10 determines that the termination condition is satisfied.

The termination condition is not satisfied otherwise, and, then, the condition search apparatus 10 proceeds to the process in step S26. The condition search apparatus 10 then adds the candidate experimental condition having the longest nearest neighbor distance selected in the (N−1)-th round to the experimental condition group, and then adds "1" to N, and returns to the process in step S20.

Figure 11A:
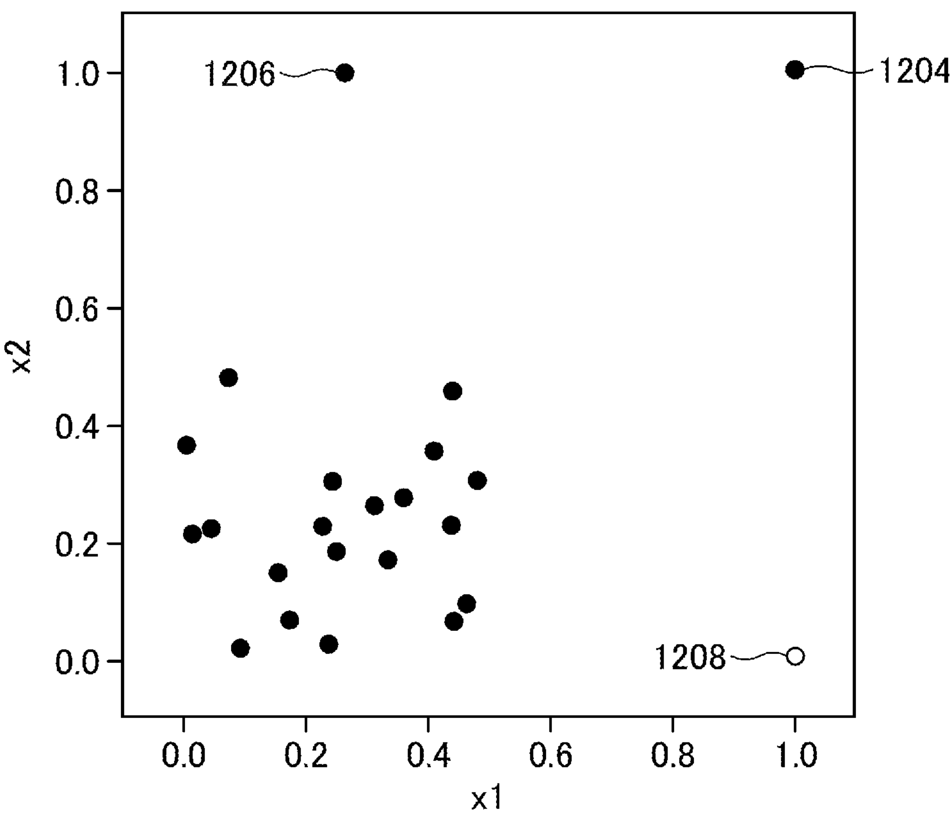
FIG. 11A A drawing illustrating an example of a candidate experimental condition having the longest nearest neighbor distance selected in a third round.
Figure 11B:
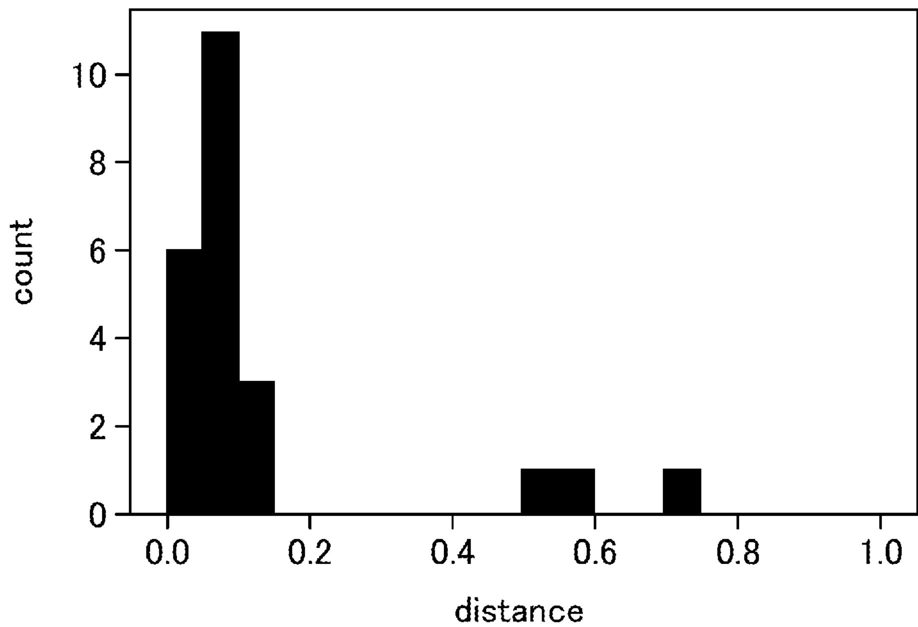
FIG. 11B A drawing illustrating an example of the candidate experimental condition having the longest nearest neighbor distance selected in the third round.

FIG. 11A and FIG. 11B are drawings illustrating an example of the candidate experimental condition having the longest nearest neighbor distance selected in the third round. FIG. 11A shows a point 1208 representing the candidate experimental condition having the longest nearest neighbor distance selected in the third round. FIG. 11B further shows an example of the histogram to which the nearest neighbor distances of the points 1204 through 1208 illustrated in FIG. 11A are added.

Figure 12A:
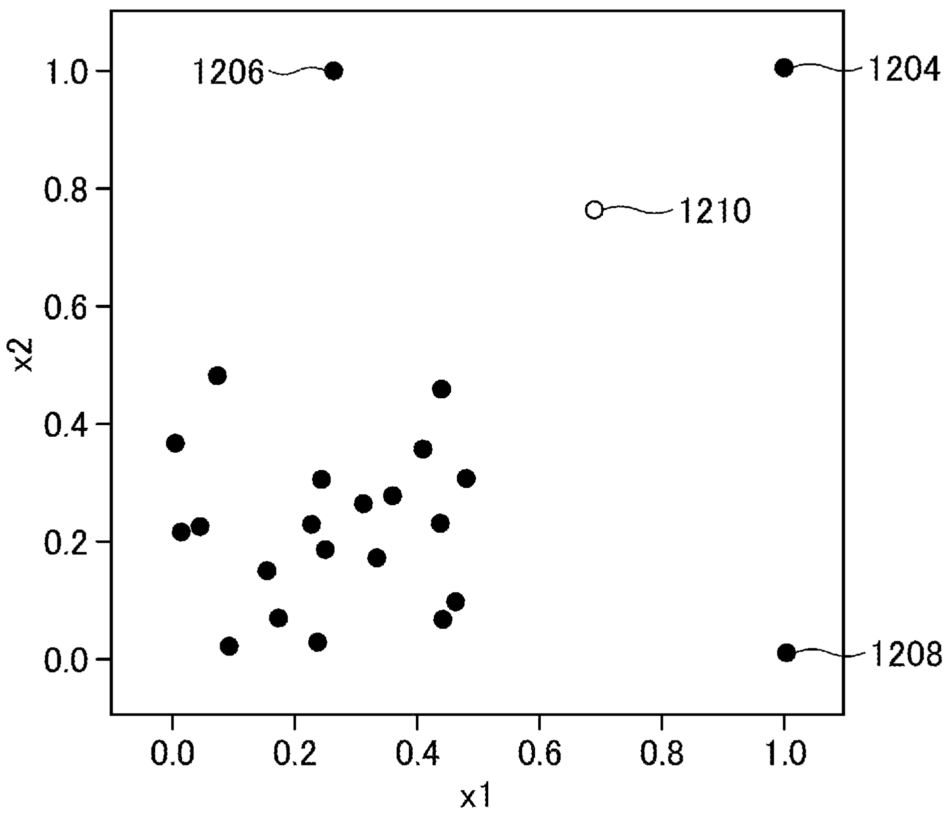
FIG. 12A A drawing illustrating an example of a candidate experimental condition having the longest nearest neighbor distance selected in a fourth round.
Figure 12B:
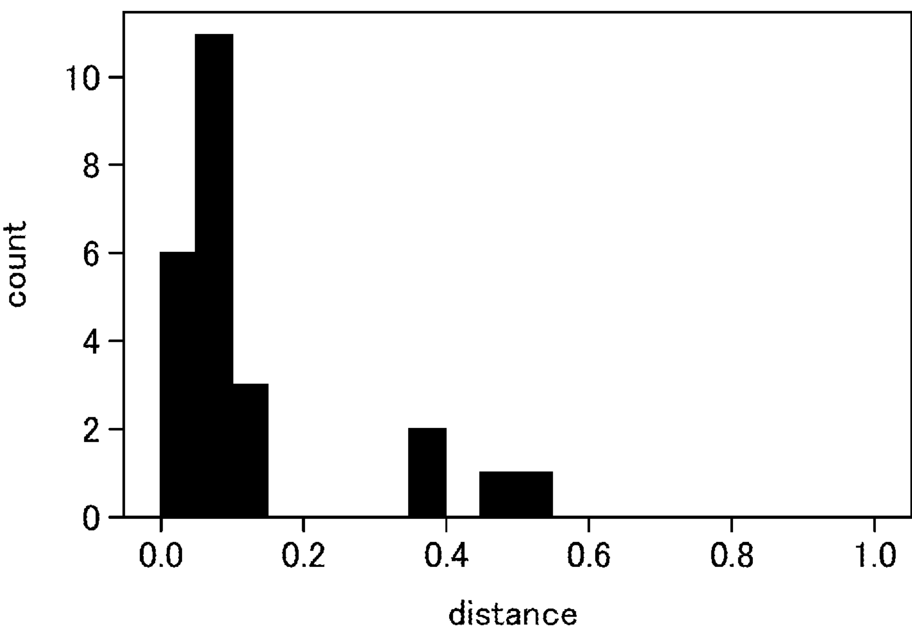
FIG. 12B A drawing illustrating an example of the candidate experimental condition having the longest nearest neighbor distance selected in the fourth round.

FIG. 12A and FIG. 12B are drawings illustrating an example of the candidate experimental condition having the longest nearest neighbor distance selected in the fourth round. A point 1210 representing the candidate experimental condition having the longest nearest neighbor distance selected in the fourth round is shown in FIG. 12A. FIG. 12B further shows an example of the histogram to which the nearest neighbor distances of the points 1204 through 1210 shown in FIG. 12A are added. The shape of the histogram in FIG. 12B is changed by the calculation for the fourth time of the nearest neighbor distances.

Figure 13A:
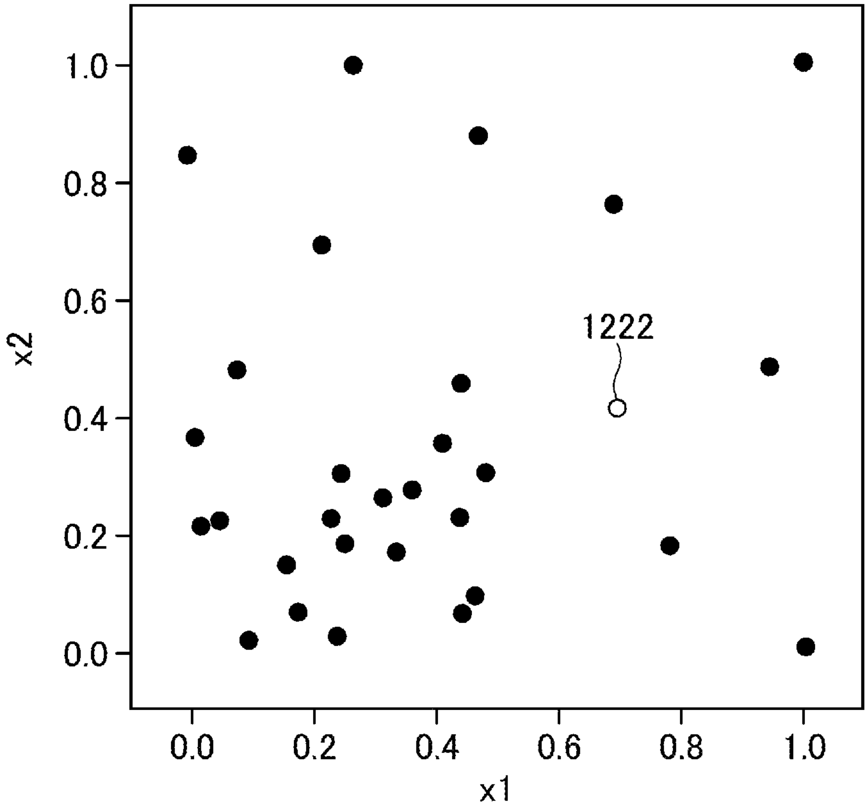
FIG. 13A A drawing illustrating an example of a candidate experimental condition having the longest nearest neighbor distance selected in a tenth round.
Figure 13B:
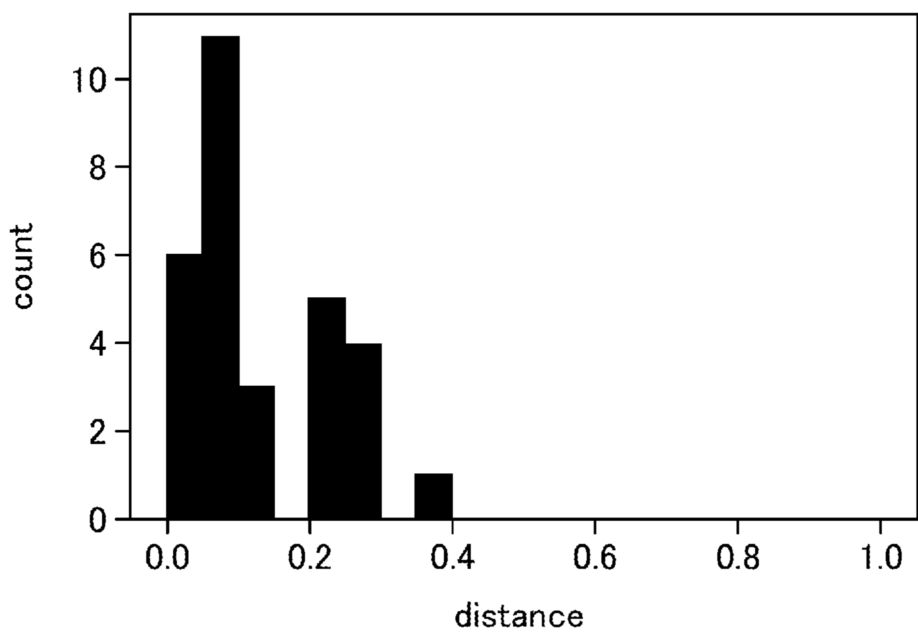
FIG. 13B A drawing illustrating an example of the candidate experimental condition having the longest nearest neighbor distance selected in the tenth round.
Figure 13C:
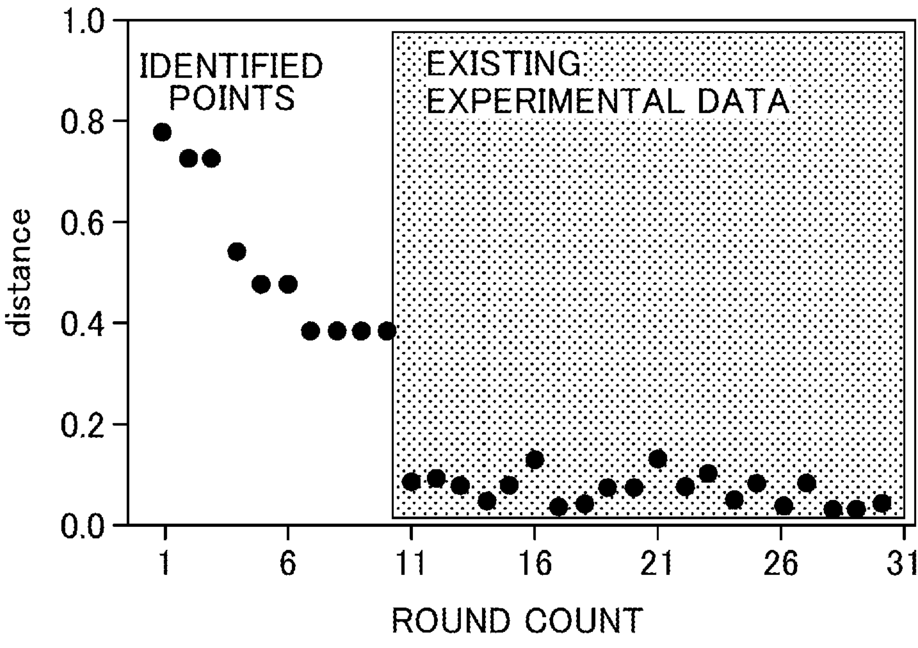
FIG. 13C A drawing illustrating an example of the candidate experimental condition having the longest nearest neighbor distance selected in the tenth round.

It is assumed that the processes in steps S20 through S26 illustrated FIG. 6 are repeated and the longest nearest neighbor distances are selected up to the tenth round. FIG. 13A through FIG. 13C are drawings illustrating examples of the candidate experimental condition having the longest nearest neighbor distance selected in the tenth round. FIG. 13A shows a point 1222 representing the candidate experimental condition having the longest nearest neighbor distance selected in the tenth round. FIG. 13B shows a histogram of the nearest neighbor distances calculated using FIG. 13A.

FIG. 13C is a diagram illustrating changes in the longest nearest neighbor distances identified in the first to tenth rounds. The first to tenth points from the left along the horizontal axis indicate the longest nearest neighbor distances identified in the first to tenth rounds, respectively. The eleventh and subsequent points from the left along the horizontal axis indicate the nearest neighbor distances of the existing experimental conditions included in the existing experiment data of experiments that have already been performed. As illustrated in FIG. 13C, the longest nearest neighbor distance becomes shorter and shorter as the processes in steps S20 through S26 are repeated multiple times, resulting in the termination condition being satisfied. When the termination condition is satisfied, the condition search apparatus 10 terminates the procedure illustrated in the flowchart of FIG. 6.

Figure 14A:
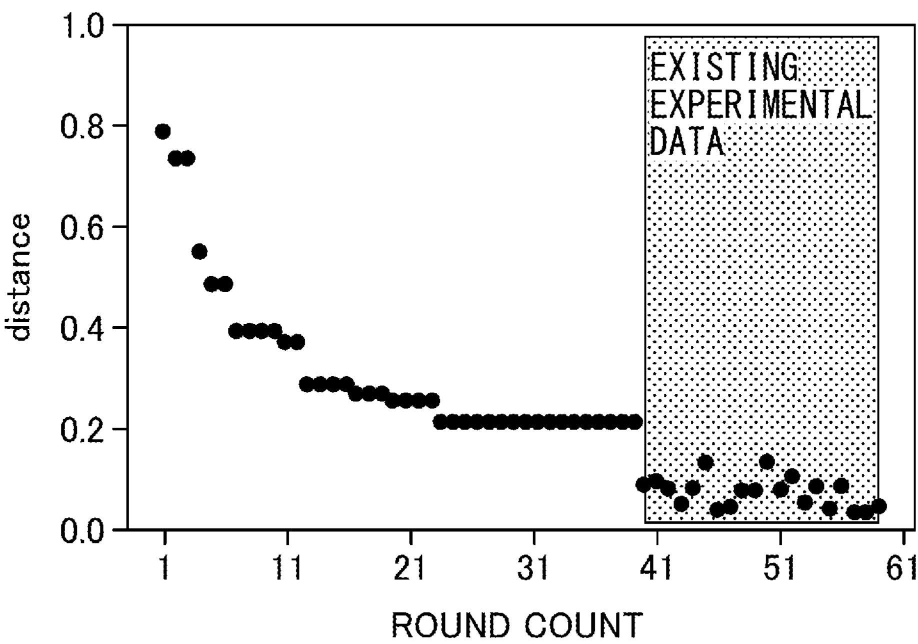
FIG. 14A A drawing illustrating changes in the longest nearest neighbor distance.

The process of determining whether the termination condition in step S24 is satisfied will further be described. FIG. 14A and FIG. 14B are drawings illustrating changes in the longest nearest neighbor distance. FIG. 14A is a drawing illustrating changes with respect to the longest nearest neighbor distances identified in the first to fortieth rounds. The first to fortieth points from the left along the horizontal axis indicate the longest nearest neighbor distances identified in the first to fortieth rounds. The forty first and subsequent points from the left along the horizontal axis indicate the nearest neighbor distances of the existing experimental conditions included in the existing experiment data of experiments that have already been performed. In addition, FIG. 14B indicates the values of the longest nearest neighbor distances identified in the first to twelfth rounds.

The condition search apparatus 10 may detect a satisfied termination condition when finding that the longest nearest neighbor distance identified in step S22 is less than the threshold, for example. In such a case, the condition search apparatus 10 determines that the termination condition is satisfied upon obtaining the longest nearest neighbor distance in the seventh round provided that the threshold is "0.4".

The condition search apparatus 10 may alternatively detect a satisfied termination condition when finding that both the longest nearest neighbor distance identified in the N-th round and the longest nearest neighbor distance identified in the (N−1)-th round are smaller than the threshold and the longest nearest neighbor distance identified in the N-th round and the longest nearest neighbor distance identified in the (N−1)-th round are different from each other. In such a case, the condition search apparatus 10 determines that the termination condition is satisfied upon obtaining the longest nearest neighbor distance in the eleventh round provided that the threshold is "0.4".

The condition search apparatus 10 determines that the longest nearest neighbor distance "0.483" identified in the sixth round, for example, does not satisfy the termination condition because the value is greater than the threshold. Further, the longest nearest neighbor distance "0.392" in the seventh round is smaller than the threshold, but the longest nearest neighbor distances in the eighth to tenth round are the same as the longest nearest neighbor distance "0.392" in the seventh round, so that the condition search apparatus 10 determines that the termination condition is not satisfied.

The condition search apparatus 10 then determines that the termination condition is satisfied when finding that the longest nearest neighbor distance "0.370" in the eleventh round is smaller than the threshold and the longest nearest neighbor distance "0.392" in the tenth round and the longest nearest neighbor distance "0.370" in the eleventh round are different from each other.

The condition search apparatus 10 detects a satisfied termination condition when both the longest nearest neighbor distance identified in the N-th round and the longest nearest neighbor distance identified the (N−1)-th round are smaller than the threshold and the longest nearest neighbor distance identified in the N-th round and the longest nearest neighbor distance identified the (N−1)-th round are different from each other. Such a termination condition is for the purpose of obtaining a data distribution of experimental conditions properly reflecting the threshold.

Figure 15A:
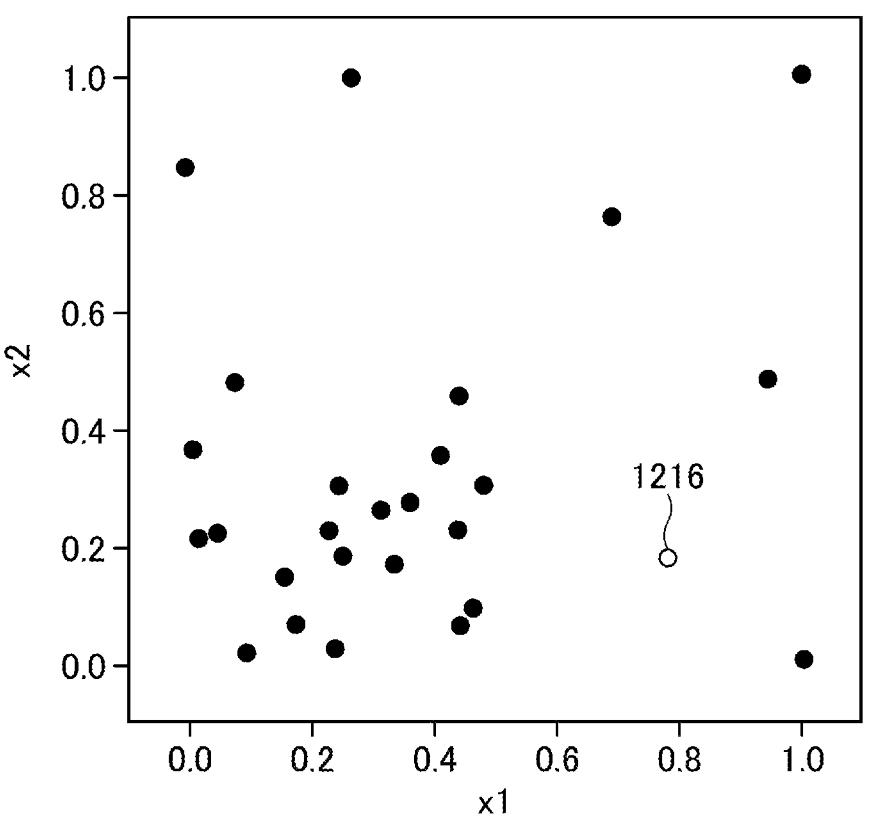
FIG. 15A A drawing illustrating an example of a data distribution of experimental conditions to which the longest nearest neighbor distance in a seventh round is added.
Figure 15B:
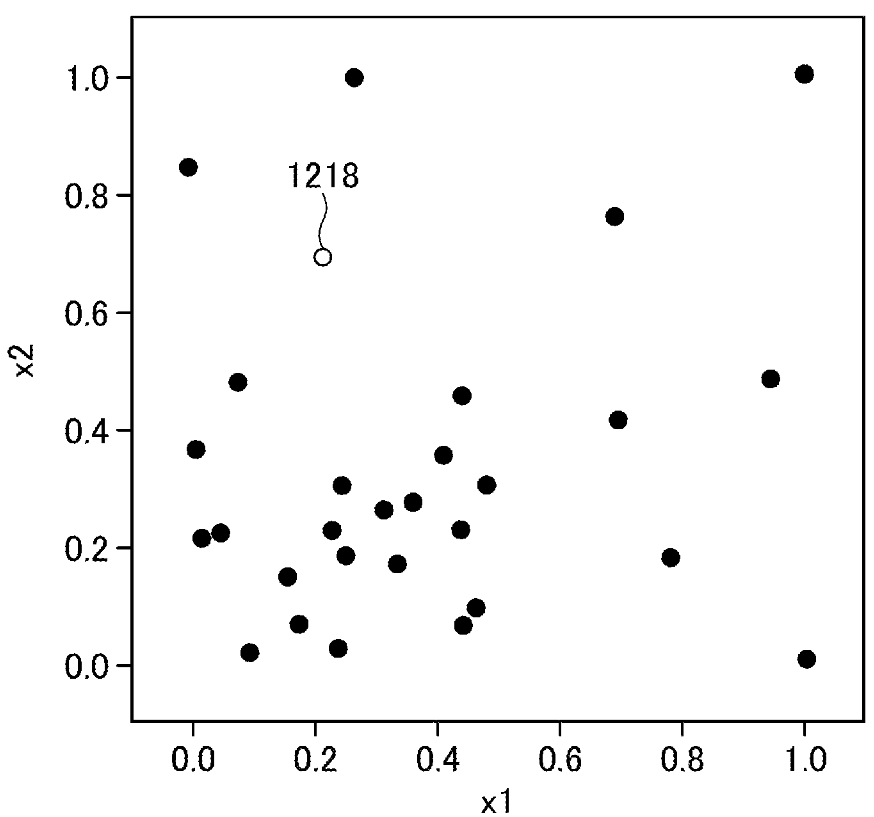
FIG. 15B A drawing illustrating an example of a data distribution of experimental conditions to which the longest nearest neighbor distance in an eighth round is added.
Figure 15C:
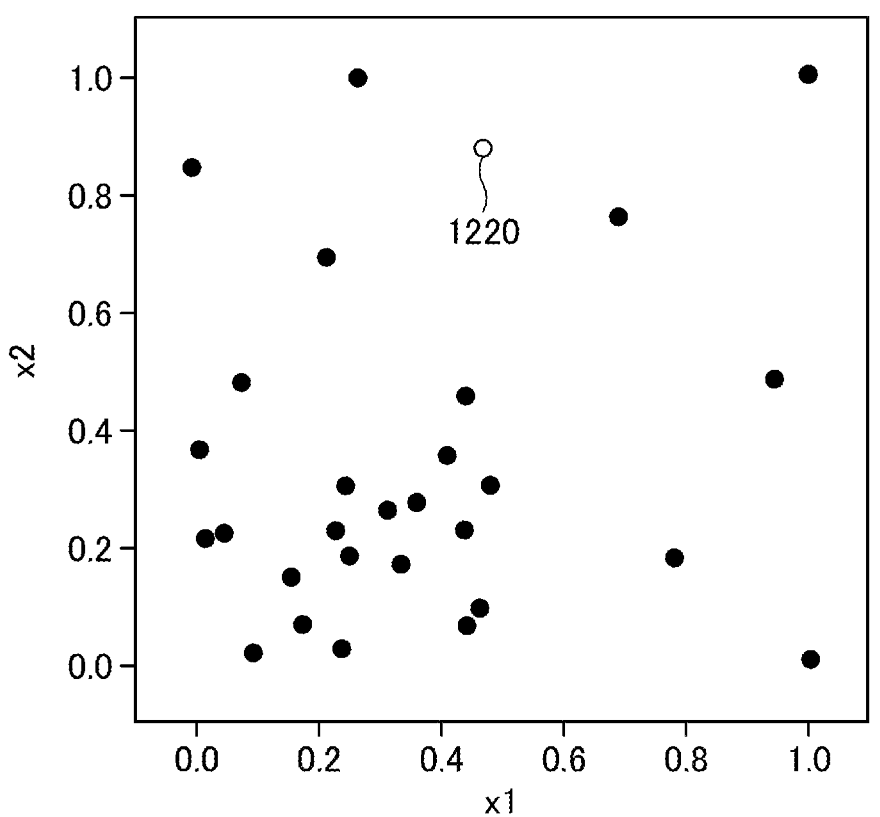
FIG. 15C A drawing illustrating an example of a data distribution of experimental conditions to which the longest nearest neighbor distance in a ninth round is added.
Figure 15D:
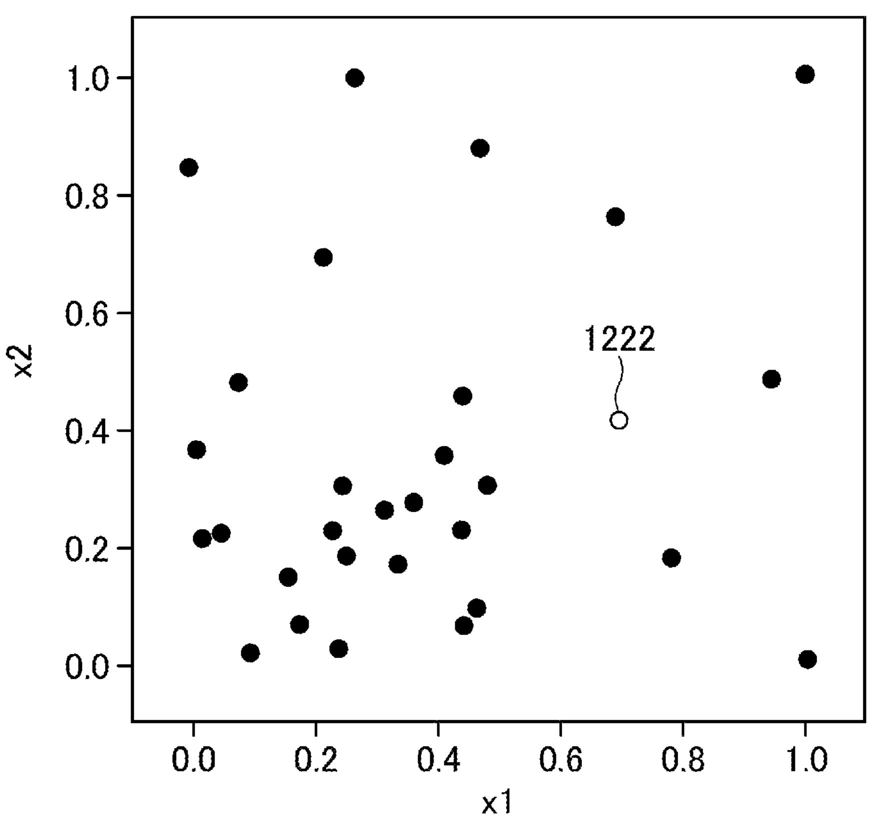
FIG. 15D A drawing illustrating an example of a data distribution of experimental conditions to which the longest nearest neighbor distance in a tenth round is added.

FIG. 15A through FIG. 15D are drawings illustrating examples of the experimental conditions to which the longest nearest neighbor distances in the seventh to tenth rounds are added. FIG. 15A shows the distribution of experimental conditions in which the longest nearest neighbor distance in the seventh round is "0.392". FIG. 15B to FIG. 15D show the distributions of experimental conditions in which the longest nearest neighbor distances in the eighth to tenth rounds are "0.392". Points 1216 through 1222 in FIG. 15A through FIG. 15D represent candidate experimental conditions selected in the seventh to tenth rounds, respectively.

If the longest nearest neighbor distance in the seventh round shown in FIG. 15A, which is "0.392", were determined as satisfying the termination condition, despite the fact that the experimental condition points providing the longest nearest neighbor distance "0.392" still remain to be identified in the eighth to tenth rounds as shown in FIG. 15B through FIG. 15D, the longest nearest neighbor distance "0.483" in the identified experimental condition distribution could not properly reflect the threshold "0.4".

In consideration of the above, the condition search apparatus 10 detects a satisfied termination condition by adopting the termination condition that both the longest nearest neighbor distance identified in the N-th round and the longest nearest neighbor distance identified the (N−1)-th round are smaller than the threshold and the longest nearest neighbor distance identified in the N-th round and the longest nearest neighbor distance identified in the (N−1)-th round are different from each other. As a result, the condition search apparatus 10 according to the present embodiment can search and obtain a data distribution of experimental conditions properly reflecting the threshold that has been set.

Figure 16A:
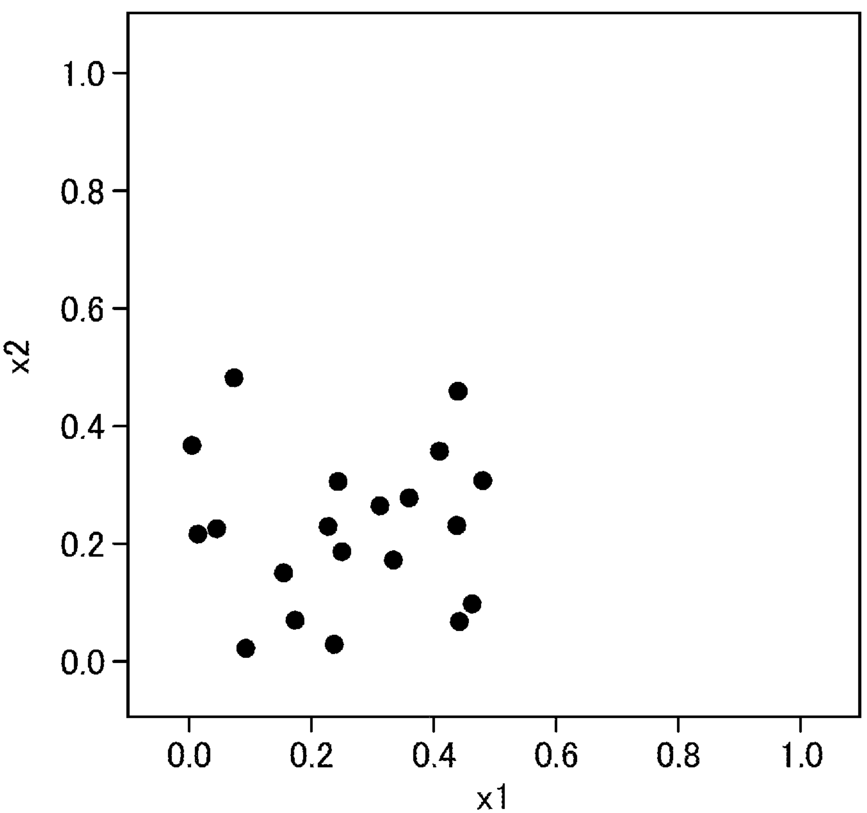
FIG. 16A A drawing illustrating an example of a relationship between the longest nearest neighbor distance and data density.
Figure 16B:
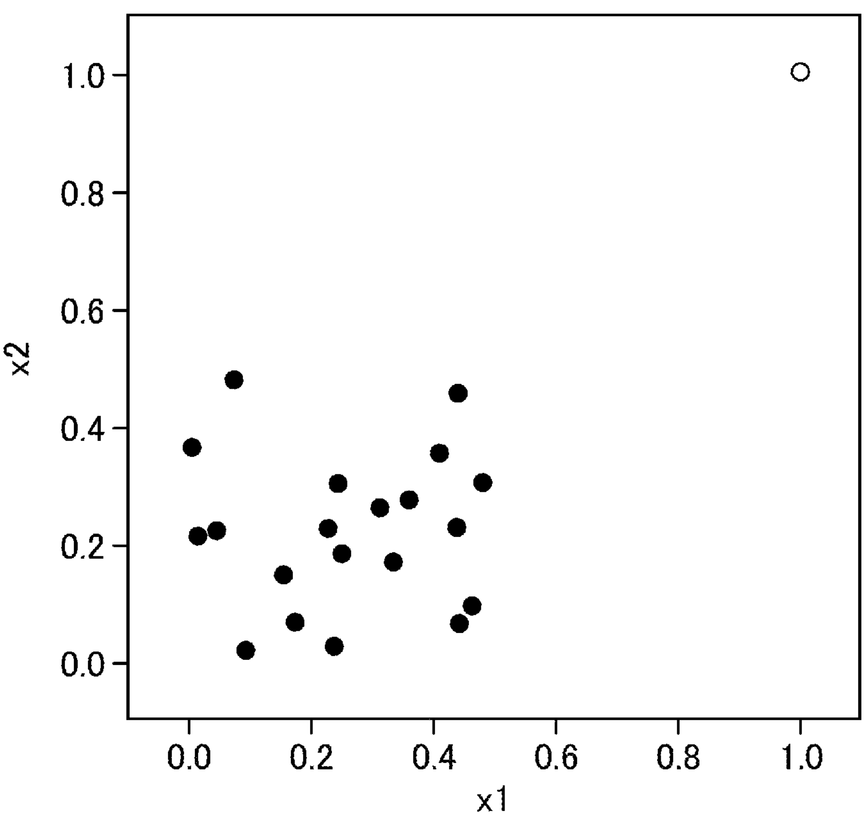
FIG. 16B A drawing illustrating an example of a relationship between the longest nearest neighbor distance and data density.
Figure 16C:
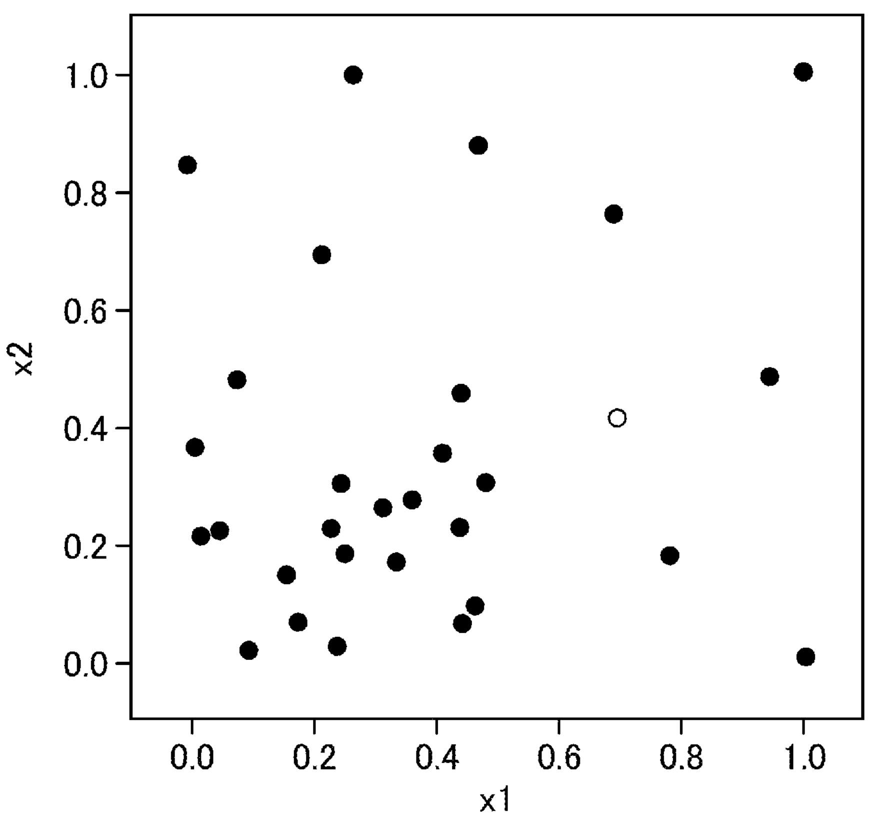
FIG. 16C A drawing illustrating an example of a relationship between the longest nearest neighbor distance and data density.
Figure 16D:
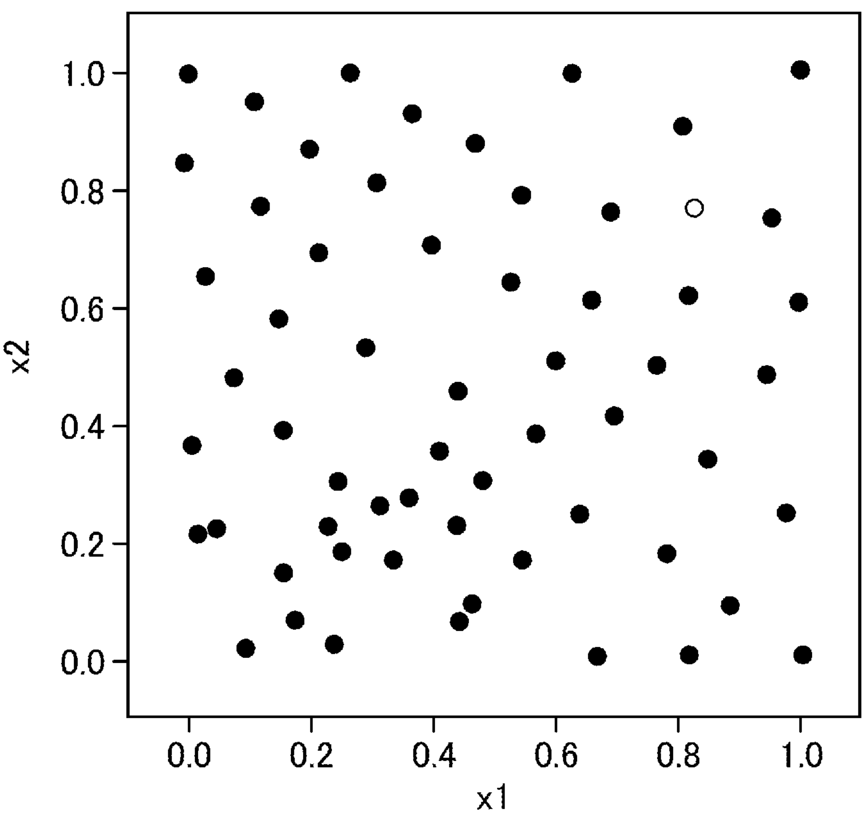
FIG. 16D A drawing illustrating an example of a relationship between the longest nearest neighbor distance and data density.

The relationship between the longest nearest neighbor distance and data density is as shown in FIG. 16A through FIG. 16D, for example. FIG. 16A through FIG. 16D are drawing illustrating examples of the relationship between the longest nearest neighbor distance and data density. FIG. 16A shows an example of a point cloud representing existing experimental conditions included in the existing experimental data of experiments that have already been performed. Whatever the distribution of the point cloud in FIG. 16A is, the data distribution of a point cloud representing new experimental conditions can be estimated from the longest nearest neighbor distance. For example, as the point cloud representing the existing experimental conditions spreads, the longest nearest neighbor distance decreases. When the point cloud representing the existing experimental conditions does not spread, the longest nearest neighbor distance becomes large.

It thus follows that, the condition search apparatus 10 according to the present embodiment sets a small threshold when dense data density in the data distribution of new experimental conditions is desired, and sets a large threshold when sparse data density in the data distribution of new experimental conditions is acceptable.

According to the condition search apparatus 10 of the present embodiment, a point (a coordinate point) at which the nearest neighbor distance to the point cloud representing existing experimental conditions is the largest is selected as a point representing a new experimental condition, which allows new experimental conditions significantly different from the existing experimental conditions to be continuously selected. Even when there are existing experimental conditions that have been searched for, for example, the condition n search apparatus 10 according to the present embodiment can easily locate a new experimental condition in a search space that has not yet been searched in the search space of experimental conditions represented by coordinates in multi-dimensional space.

Other Embodiments

Experimental conditions for composing a material located by the condition search apparatus 10 according to the present embodiment may be used as data input into laboratory equipment that composes the material based on the experimental conditions for composing the material, for example. The condition search apparatus 10 according to the present embodiment may acquire evaluation results on whether or not desired property is satisfied from an evaluation device that evaluates the required property of a material composed by the laboratory equipment, and may repeat a process of searching for experimental conditions for composing the material by using the acquired evaluation results as existing experimental data of experiments that have already been performed and that includes information on the existing experimental conditions.

With respect to industrial applicability, for example, the condition search apparatus 10 according to the present embodiment may be used in various fields relating to combinatorial optimization such as a search for resin compositions. More specific examples of application include a search for the combination of types of resin that is optimal for use in a flexible transparent film.

As described above, according to the information processing system 1 of the present embodiment, it is possible to provide a program, a condition search apparatus, and a condition search method capable of efficiently searching for a new condition from one or more conditions represented by coordinates in a multi-dimensional space.

Although the present embodiment has been described above, it will be understood that various modifications to form and details may be made without departing from the spirit and scope of the appended claims. Although the present invention has been described based on the embodiments, the present invention is not limited to the above-described embodiments, and various modifications may be made within the scope defined in the claims. This application claims priority to basic Japanese Patent Application No. 2021-153879 filed on Sep. 22, 2021, with the Japan Patent Office, the entire contents of which are incorporated herein by reference.

DESCRIPTION OF SYMBOLS

1 information processing system
10 condition search apparatus
12 user terminal
18 communication network
20 information display unit
22 operation receiving unit
24 request transmitting unit
26 response receiving unit
30 candidate condition generating unit
32 candidate condition selecting unit
34 new condition adding unit
36 threshold setting receiving unit
38 output unit
40 experimental condition storage unit
42 threshold storage unit

The invention claimed is:

1. A non-transitory computer-readable recording medium having a program embodied therein for causing a computer to:

store one or more experimental conditions for composing a material represented by coordinates in a multi-dimensional space;

generate a plurality of candidate experimental conditions represented by coordinates in an unsearched region of the multi-dimensional space by using random numbers or lattice points;

calculate, for a coordinate position of each of the candidate experimental conditions, a shortest distance to coordinate positions of the one or more experimental conditions, and select, as a coordinate position of a new experimental condition, a coordinate position of one of the candidate experimental conditions for which the shortest distance is longest;

update an experimental condition group by adding the selected coordinate position of the new experimental condition to the coordinate positions of the one or more experimental conditions such that shortest distances for remaining candidate experimental conditions are recalculated with respect to the updated experimental condition group; and output the new experimental condition as data input into laboratory equipment that composes the material based on the new experimental condition, wherein the program is for causing the computer to repeat, until a termination condition is satisfied, a process of calculating, for a coordinate position of each of the candidate experimental conditions, a shortest distance to the coordinate positions of the one or more experimental conditions to which the new experimental condition is added, and selecting, as a coordinate position of a new experimental condition, a coordinate position of one of the candidate experimental conditions for which the shortest distance is longest.

2. The non-transitory computer-readable recording medium as claimed in claim 1, the program being for further causing the computer to:

accept a setting of a threshold from a user wherein the program is for causing the computer to determine whether the termination condition is satisfied based on a result of comparison between the shortest distance that is longest and the threshold.

3. The non-transitory computer-readable recording medium as claimed in claim 2, wherein the program is for causing the computer to determine that the termination condition is satisfied when both the shortest distance of one of the candidate experimental conditions selected in an N-th round and the shortest distance of one of the candidate experimental conditions selected in an (N−1)-th round are less than or equal to the threshold and the shortest distance of the one of the candidate experimental conditions selected in the N-th round and the shortest distance of the one of the candidate experimental conditions selected in the (N−1)-th round are different from each other.

4. The non-transitory computer-readable recording medium as claimed in claim 1, wherein the program is for causing the computer to generate the plurality of candidate experimental conditions by using random numbers, lattice points, or a design of experiments method.

5. The non-transitory computer-readable recording medium as claimed in claim 1, wherein the program is for causing the computer to select the coordinates of the new experimental condition such that the coordinates of the one or more experimental conditions and the coordinates of the new experimental condition are scattered in the multi-dimensional space.

6. A condition search apparatus comprising:

a memory configured to store one or more experimental conditions for composing a material represented by coordinates in a multi-dimensional space; and a processor coupled to the memory and configured to:

generate a plurality of candidate experimental conditions represented by coordinates in an unsearched region of the multi-dimensional space by using random numbers or lattice points;

calculate, for a coordinate position of each of the candidate experimental conditions, a shortest distance to coordinate positions of the one or more experimental conditions, and select, as a coordinate position of a new experimental condition, a coordinate position of one of the candidate experimental conditions for which the shortest distance is longest;

update an experimental condition group by adding the selected coordinate position of the new experimental condition to the coordinate positions of the one or more experimental conditions such that shortest distances for remaining candidate experimental conditions are recalculated with respect to the updated experimental condition group; and output the new experimental condition as data input into laboratory equipment that composes the material based on the new experimental condition, wherein the processor is configured to repeat, until a termination condition is satisfied, a process of calculating, for a coordinate position of each of the candidate experimental conditions, a shortest distance to the coordinate positions of the one or more experimental conditions to which the new experimental condition is added, and selecting, as a coordinate position of a new experimental condition, a coordinate position of one of the candidate experimental conditions for which the shortest distance is longest.

7. A condition search method comprising:

storing one or more experimental conditions for composing a material represented by coordinates in a multi-dimensional space;

generating a plurality of candidate experimental conditions represented by coordinates in an unsearched region of the multi-dimensional space by using random numbers or lattice points;

calculating, for a coordinate position of each of the candidate experimental conditions, a shortest distance to coordinate positions of the one or more experimental conditions, and selecting a coordinate position of one of the candidate experimental conditions for which the shortest distance is longest as a coordinate position of a new experimental condition;

updating an experimental condition group by adding the selected coordinate position of the new experimental condition to the coordinate positions of the one or more experimental conditions such that shortest distances for remaining candidate experimental conditions are recalculated with respect to the updated experimental condition group; and outputting the new experimental condition as data input into laboratory equipment that composes the material based on the new experimental condition, wherein the calculating, for a coordinate position of each of the candidate experimental conditions, a shortest distance to coordinate positions of the one or more experimental conditions to which the new experimental condition is added, the selecting a coordinate position of one of the candidate experimental conditions for which the shortest distance is longest as a coordinate position of a new experimental condition, and the adding the selected coordinate position of the new experimental condition to the coordinate positions of the one or more experimental conditions are repeated until a termination condition is satisfied.

* * * * *